United States Patent
Yang et al.

(10) Patent No.: US 12,468,199 B2
(45) Date of Patent: Nov. 11, 2025

(54) COLOR FILM SUBSTRATE, METHOD FOR MANUFACTURING THE SAME AND DISPLAY PANEL

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Yuanhang Yang, Beijing (CN); Fengguo Wang, Beijing (CN); Yezhou Fang, Beijing (CN); Yongsheng Li, Beijing (CN); Zhen Shi, Beijing (CN); Bo Wang, Beijing (CN); Lei Gao, Beijing (CN); Shilong Zhang, Beijing (CN); Guojiang Yu, Beijing (CN)

(73) Assignees: ORDOS YUANSHENG OPTOELECTRONICS CO., LTD., Inner Mongolia (CN); BEIJING BOE TECHNOLOGY DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 18/682,293

(22) PCT Filed: Feb. 1, 2023

(86) PCT No.: PCT/CN2023/074117
§ 371 (c)(1),
(2) Date: Feb. 8, 2024

(87) PCT Pub. No.: WO2024/159450
PCT Pub. Date: Aug. 8, 2024

(65) Prior Publication Data
US 2025/0130469 A1    Apr. 24, 2025

(51) Int. Cl.
*G02F 1/1335* (2006.01)
*G02F 1/1362* (2006.01)

(52) U.S. Cl.
CPC .. *G02F 1/136222* (2021.01); *G02F 1/136209* (2013.01)

(58) Field of Classification Search
CPC .............. G02F 1/136222; G02F 1/136209
See application file for complete search history.

(56) References Cited

U.S. PATENT DOCUMENTS

2015/0153614 A1   6/2015   Qi et al.
2015/0248051 A1*  9/2015   Yang ................ G02F 1/133516
                                                      430/7
(Continued)

FOREIGN PATENT DOCUMENTS

CN         2826476 Y      10/2006
CN       102331595 A       1/2012
(Continued)

OTHER PUBLICATIONS

English Machine Translation of Huang TW 138 2207 (Year: 2025).*

*Primary Examiner* — Donald L Raleigh
(74) *Attorney, Agent, or Firm* — Armstrong Teasdale LLP

(57) ABSTRACT

Embodiments of the present disclosure provide a color film substrate, a method for manufacturing the same and a display device. The color film substrate includes a substrate including a plurality of first recesses extending in a first direction, respectively, a plurality of first tabs arranged alternately with the plurality of first recesses in a second direction perpendicular to the first direction, a plurality of first black matrix strips disposed at least partially on the plurality of first tabs, respectively and extending in the first (Continued)

direction, and a color resist layer disposed in the plurality of first recesses and in gaps among the plurality of first black matrix strips.

20 Claims, 12 Drawing Sheets

(56) References Cited

U.S. PATENT DOCUMENTS

| | | | |
|---|---|---|---|
| 2016/0178959 A1* | 6/2016 | Xu | G02F 1/136209 |
| | | | 359/891 |
| 2020/0292895 A1* | 9/2020 | Park | G02F 1/136209 |
| 2021/0048908 A1* | 2/2021 | Dai | H10K 71/00 |
| 2022/0043297 A1* | 2/2022 | Zha | G02F 1/133512 |
| 2022/0113587 A1* | 4/2022 | Dong | G02F 1/133548 |

FOREIGN PATENT DOCUMENTS

| | | | | |
|---|---|---|---|---|
| CN | 102707565 A | 10/2012 | | |
| CN | 102789089 A | 11/2012 | | |
| CN | 103149731 A | 6/2013 | | |
| CN | 103744222 A | 4/2014 | | |
| CN | 104423088 A | 3/2015 | | |
| CN | 105676332 A | 6/2016 | | |
| CN | 105974642 A | 9/2016 | | |
| CN | 106547141 A | 3/2017 | | |
| CN | 108205220 A | 6/2018 | | |
| CN | 208780957 U | 4/2019 | | |
| CN | 113219697 A | 8/2021 | | |
| JP | H1114821 A | 1/1999 | | |
| JP | 2003243172 A | 8/2003 | | |
| JP | 2006337389 A | 12/2006 | | |
| TW | I382207 B | * | 1/2013 | ....... B29D 11/00634 |

* cited by examiner

COLOR FILM SUBSTRATE, METHOD FOR MANUFACTURING THE SAME AND DISPLAY PANEL

CROSS REFERENCE TO RELATED APPLICATIONS

This patent application is a National Stage Entry of PCT/CN2023/074117 filed on Feb. 1, 2023, the disclosure of which is incorporated by reference herein in its entirety as part of the present application.

BACKGROUND

The present disclosure relates to the field of display technology, and in particular to a color film substrate, a method for manufacturing a color film substrate and a display panel.

The development of display panel industry has promoted the wide application in the field of electronic products, such as computers, TVs, cell phones, digital cameras, video cameras, mobile multimedia, advertising displays, etc. In the information era, display panels have become the core power of the electronic industry. In order to obtain better user experience, the PPI (pixels per inch) of the display panel has also been increasing. Especially with the arrival of the meta-universe era, ultra-high PPI products are increasingly favored by consumers.

BRIEF DESCRIPTION

Embodiments of the present disclosure provide a color film substrate, a method for manufacturing the same, and a display panel.

An aspect of the present disclosure provides a color film substrate including a substrate including a plurality of first recesses each extending in a first direction, and a plurality of first tabs arranged alternately with the plurality of first recesses in a second direction perpendicular to the first direction, a plurality of first black matrix strips disposed at least partially on the plurality of first tabs, respectively, and each extending in the first direction, and a color resist layer disposed in the plurality of first recesses and in gaps between adjacent first black matrix strips of the plurality of first black matrix strips.

In some embodiments of the present disclosure relating to the color film substrate, the color film substrate further includes a plurality of second black matrix strips disposed in a different layer than the plurality of first black matrix strips, the plurality of second black matrix strips each extending in the second direction and intersecting with the plurality of first black matrix strips, to define, together with the plurality of first black matrix strips, a plurality of openings for accommodating the color resist layer.

In some embodiments of the present disclosure relating to the color film substrate, the color resist layer has a thickness in a direction perpendicular to the substrate substantially equal to a sum of a depth of the first recess in the direction perpendicular to the substrate and a thickness of the first black matrix strip in the direction perpendicular to the substrate.

In some embodiments of the present disclosure relating to the color film substrate, the color resist layer includes a plurality of color resists corresponding one-to-one with the plurality of openings, wherein at least a surface of at least one of the plurality of first black matrix strips close to the substrate has a width in the second direction greater than a width of at least one of the plurality of first tabs in the second direction such that a portion of at least one of the plurality of color resists between adjacent first black matrix strips has a width in the second direction less than a width of another portion of the at least one of the plurality of color resists in corresponding first recess.

In some embodiments of the present disclosure relating to the color film substrate, a ratio of a thickness of each of the plurality of color resists in a direction perpendicular to the substrate to a depth of each of the plurality of first recesses in the direction perpendicular to the substrate ranges from 3.5 to 12.5.

In some embodiments of the present disclosure relating to the color film substrate, a surface of at least one of the plurality of first black matrix strips facing the substrate has a width in the second direction less than a width of a surface of the at least one of the plurality of first black matrix strips facing away from the substrate such that a cross-section, perpendicular to the first direction, of the at least one of the plurality of first black matrix strips has a shape with substantial inverted trapezoid.

In some embodiments of the present disclosure relating to the color film substrate, a ratio of the width of the surface of the at least one of the plurality of first black matrix strips facing away from the substrate to the width of the surface of the at least one of the plurality of first black matrix strips facing the substrate ranges from 1.05 to 1.73.

In some embodiments of the present disclosure relating to the color film substrate, a waist of the inverted trapezoid has an angle of inclination relative to a third direction perpendicular to the substrate ranging from 3° to 10°.

In some embodiments of the present disclosure relating to the color film substrate, each of the plurality of first tabs and each of the plurality of first recesses extend continuously in the first direction, and the plurality of first black matrix strips are disposed on the plurality of first tabs, respectively.

In some embodiments of the present disclosure relating to the color film substrate, parts of at least one of the plurality of second black matrix strips at positions intersecting with the plurality of first black matrix strips are superimposed on the plurality of first black matrix strips.

In some embodiments of the present disclosure relating to the color film substrate, at least one of the plurality of first black matrix strips has a substantially uniform thickness, and parts of the at least one of the plurality of second black matrix strips at the positions intersecting with the plurality of first black matrix strips has a thickness less than a thickness of parts of the at least one of the plurality of second black matrix strips at positions non-intersecting with the plurality of first black matrix strips.

In some embodiments of the present disclosure relating to the color film substrate, the thickness of the parts of the at least one of the plurality of second black matrix strips at the positions intersecting with the plurality of first black matrix strips is less than the thickness of the at least one of the plurality of first black matrix strips, and the thickness of the parts of the at least one of the plurality of second black matrix strips at the positions non-intersecting with the plurality of first black matrix strips is greater than the thickness of the at least one of the plurality of first black matrix strips.

In some embodiments of the present disclosure relating to the color film substrate, the thickness of the parts of the at least one of the plurality of second black matrix strips at the positions non-intersecting with the plurality of first black matrix strips is less than a sum of the thickness of the first black matrix strip and a thickness of the first tab.

In some embodiments of the present disclosure relating to the color film substrate, at least one of the plurality of second black matrix strips includes a plurality of curved portions surrounding the plurality of first black matrix strips intersecting with the at least one of the plurality of second black matrix strips and a plurality of flat portions connecting the plurality of curved portions, the plurality of flat portions being disposed in the plurality of recesses and in the gaps between adjacent first black matrix strips.

In some embodiments of the present disclosure relating to the color film substrate, an angle between a curved surface of the curved portion away from the substrate and a surface of the flat portion away from the substrate at a junction of the curved portion and the flat portion is an obtuse angle.

In some embodiments of the present disclosure relating to the color film substrate, the obtuse angle ranges from 110° to 120°.

In some embodiments of the present disclosure relating to the color film substrate, at least one of the plurality of first recesses has a substantial rectangular cross-section perpendicular to the first direction.

In some embodiments of the present disclosure relating to the color film substrate, the substrate includes a first area and a second area, the plurality of first black matrix strips, the plurality of second black matrix strips, the plurality of first recesses, and the color resist layer being disposed in the first area of the substrate. The second area includes an additional black matrix formed integrally with the plurality of first black matrix strips or the plurality of second black matrix strips, wherein the first area is a display area and the second area is a dummy area.

In some embodiments of the present disclosure relating to the color film substrate, each first black matrix strip has a substantially uniform thickness, and the additional black matrix has a thickness in a direction perpendicular to the substrate substantially equal to the thickness of at least one of the plurality of first black matrix strips in the direction perpendicular to the substrate.

In some embodiments of the present disclosure relating to the color film substrate, the color film substrate further includes a planarization layer disposed on the plurality of first black matrix strips, the plurality of second black matrix strips, and the color resist layer, wherein the planarization layer extends from the first area to the second area to cover the additional black matrix. A portion of the planarization layer in the first area has a thickness greater than a thickness of a portion of the planarization layer in the second area.

In some embodiments of the present disclosure relating to the color film substrate, the substrate further includes a plurality of second tabs each extending in the second direction, wherein the plurality of second tabs intersect with the plurality of first tabs such that each first recess is divided by the plurality of second tabs into a plurality of separated first sub-recesses, wherein the plurality of second black matrix strips are disposed on the plurality of second tabs, respectively, and wherein the color resists of the color resist layer are disposed in the plurality of first sub-recesses and in the plurality of openings defined by the plurality of first black matrix strips and the plurality of second black matrix strips.

In some embodiments of the present disclosure relating to the color film substrate, the substrate further includes a plurality of second recesses each extending in the second direction, wherein each of the plurality of first tabs includes a plurality of raised islands spaced apart by the plurality of second recesses.

In some embodiments of the present disclosure relating to the color film substrates, each of the plurality of first black matrix strips includes a first portion disposed on the plurality of raised islands and a second portion disposed in the plurality of second recesses, and each of the plurality of second black matrix strips includes a third portion disposed on the plurality of first black matrix strips and a fourth portion disposed in the plurality of first recesses, wherein a thickness of the first portion is less than a thickness of the second portion and a thickness of the third portion is less than a thickness of the fourth portion.

In some embodiments of the present disclosure relating to the color film substrate, a surface of at least one of the plurality of second black matrix strips close to the substrate has a width less than a width of a surface of the at least one of the plurality of second black matrix strips away from the substrate such that a cross-section, perpendicular to the second direction, of the at least one of the plurality of second black matrix strips has a shape with substantial inverted trapezoid.

Another aspect of the present disclosure further provides a display panel, the display panel including any one of the color film substrates provided in accordance with some embodiments of the present disclosure, the display panel further including an array substrate disposed opposite the color film substrate, at least one main spacer and at least one sub-spacer on the color film substrate, and at least one opposing spacer disposed on the array substrate and opposite the main spacer.

In some embodiments relating to the display panel, the at least one main spacer has a thickness greater than a thickness of the at least one sub-spacer, the display panel includes a display area and a dummy area, the at least one opposing spacer includes at least one first opposing spacer in the display area and at least one second opposing spacer in the dummy area, and the at least one first opposing spacer in the display area has a thickness less than a thickness of the at least one second opposing spacer in the dummy area.

Another aspect of the present disclosure further provides a method for manufacturing the color film substrate according to any of the embodiments described herein, including providing a substrate, forming on the substrate a plurality of first recesses each extending in a first direction, thereby forming a plurality of first tabs arranged alternately with the plurality of first recesses in a second direction perpendicular to the first direction, and forming a plurality of first black matrix strips extending in the first direction such that the plurality of first black matrix strips are at least partially disposed on the plurality of first tabs.

In embodiments relating to the method for manufacturing the color film substrate, the method further includes forming a plurality of second black matrix strips each extending in the second direction such that the plurality of second black matrix strips intersects with the plurality of first black matrix strips to define, together with the plurality of first black matrix strips, a plurality of openings for accommodating the color resist layer, and forming a color resist layer in the plurality of first recesses and in gaps between adjacent black matrix strips of the plurality of first black matrix strips.

Further aspects and areas of applicability will become apparent from the description provided herein. It should be understood that various aspects of this application may be implemented individually or in combination with one or more other aspects. It should also be understood that the description and specific examples herein are intended for purposes of illustration only and are not intended to limit the scope of the present application.

BRIEF DESCRIPTION OF THE DRAWINGS

The drawings described herein are for illustrative purposes only of selected embodiments and not all possible implementations, and are not intended to limit the scope of the present application, in which.

Corresponding reference numerals indicate corresponding parts or features throughout the several views of the drawings.

DETAILED DESCRIPTION

Figure 1:
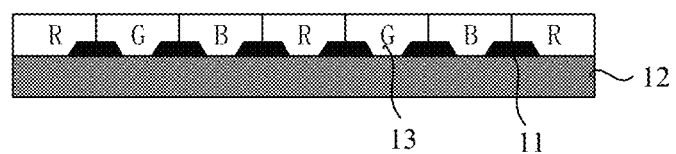
FIG. 1 schematically illustrates a cross-sectional view of a color film substrate in the related art.

Various embodiments, which are provided as exemplary examples of the present disclosure, will now be described in detail with reference to the accompanying drawings to enable those skilled in the art to implement the present disclosure.

It should be noted that the following accompanying drawings and examples are not meant to limit the scope of the present disclosure. Where particular elements of the present disclosure may be partially or fully implemented using known components (or methods or processes), only those parts of such known components (or methods or processes) that are necessary for an understanding of the present disclosure will be described, and the detailed descriptions of other parts of such known components will be omitted so as not to confuse the present disclosure. Further, various embodiments encompass present and future known equivalents to the components referred to herein by way of illustration.

The singular form of words used herein and in the appended claims includes the plural, and vice versa, unless the context clearly indicates otherwise. Thus, when referring to the singular, the plural of the corresponding term is usually included. Similarly, the terms "comprising", "including", "containing" and "having" and grammatical variants thereof are intended to be inclusive and indicate that elements other than those listed may be present. Where the term "example" is used herein, particularly when followed by a group of terms, the "example" is merely illustrative and expository and should not be considered exclusive or broad.

As used herein, the term "be located on" does, however, not refer to a specific geometric orientation of the final stack in the display panel or the display device with respect to a direction of a gravitational force but rather indicates a way of manufacturing the stack, which, after manufacturing, could, in general, be placed in any geometric orientation, also such as turned upside down. The terms "first", "second", "third", etc. are used for descriptive purposes only and should not be construed to indicate or imply relative importance and order of formation.

A display panel generally includes a color film substrate, an array substrate disposed opposite the color film substrate, and a liquid crystal layer disposed between the color film substrate and the array substrate. The color film substrate generally includes a substrate, a black matrix disposed on the substrate, and a color resist layer disposed in an opening defined by the black matrix.

The black matrix divides pixels in different rows and pixels in different columns by means of a plurality of rows of black matrix strips and a plurality of columns of black matrix strips that intersect vertically and horizontally to prevent color mixing between pixels and to obscure some components of the display panel that are not desired to be seen by a user, such as a signal line, a spacer. By way of example, the black matrix may include a plurality of longitudinal black matrix strips (which may extend in the same direction as the extension direction of the data lines of the display panel, and thus may also be referred to as Date-oriented BMs) and a plurality of transversal black matrix strips (which may extend in the same direction as the extension direction of the gate lines of the display panel, and thus may also be referred to as Gate-oriented BMs). Typically, longitudinal BMs may separate pixels of different colors, while a transversal BMs may divide the same column of pixels into multiple sub-pixels.

It should be noted that the terms "transversal" and "longitudinal" herein are relative to the orientation of the display panel, and that if the orientation of the display panel rotates (e.g., by 90 degrees), the "transversal" and "longitudinal" are interchangeable, i.e., "transversal" may be changed to "longitudinal" and "longitudinal" may also be changed to "transversal".

In the related art, especially in a near-eye display device with a high PPI requirement, the pixel size is usually very small, and a width of a matrix strip of the corresponding black matrix on the color film substrate is also relatively small. FIG. 1 schematically illustrates a cross-sectional view of a color film substrate in the related art. As shown in FIG. 1, a black matrix 11 is disposed on a substrate 12, and a cross-section of the matrix strip of the black matrix 11 is generally positive trapezoidal. The color resist layer 13 may include a red color resist R (corresponding to a red sub-pixel), a green color resist G (corresponding to a green sub-pixel), and a blue color resist B (corresponding to a blue sub-pixel). A thickness of the color resist layer 13 is generally greater than a thickness of the black matrix 11. In a near-eye display device with a high PPI requirement, as shown in FIG. 1, in order to prevent light leakage and to increase the aperture rate as much as possible, each color resist of the color resist layer 13, in addition to filling the opening defined by the black matrix 11, extend in the transversal direction to lap over the neighboring black matrix strips, and even there may be a certain degree of overlap between adjacent color resists, which results in a crosstalk phenomenon at an oblique viewing angle.

Figure 2:
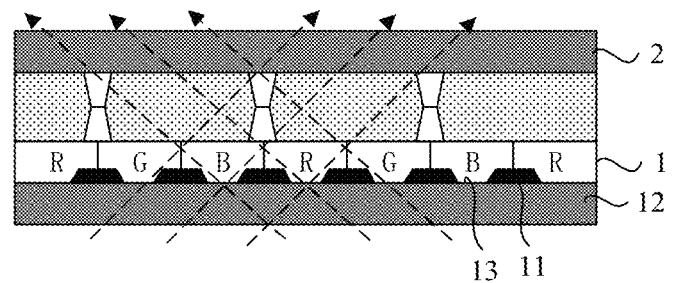
FIG. 2 schematically illustrates an optical path with crosstalk caused by an arrangement of a black matrix and a color resist of the color film substrate shown in FIG. 1.

FIG. 2 schematically illustrates an optical path with crosstalk caused by an arrangement of a black matrix and a color resist of the color film substrate shown in FIG. 1. As shown in FIG. 2, the color film substrate 1 and the array substrate 2 may be cell assembled to form a display panel. When the display panel is viewed at an oblique viewing angle, crosstalk is likely to occur between adjacent sub-pixels. For example, light emitted from a green sub-pixel (green color resist G) may be observed in the field of view of a blue sub-pixel (blue color resist B), and light emitted from a blue sub-pixel may be observed in the field of view of a red sub-pixel (red color resist R). This crosstalk phenomenon will seriously affect the display effect of the display panel.

In some embodiments of the present disclosure, there is provided a color film substrate including a substrate including a plurality of first recesses each extending in a first direction, and a plurality of first tabs arranged alternately with the plurality of first recesses in a second direction perpendicular to the first direction, a plurality of first black matrix strips disposed at least partially on the plurality of first tabs, respectively, and each extending in the first direction, and a color resist layer disposed in the plurality of first recesses and in gaps between adjacent first black matrix strips of the plurality of first black matrix strips.

In some embodiments of the present disclosure, the color film substrate may further include a plurality of second black matrix strips disposed in a different layer with the plurality of first black matrix strips, the plurality of second black matrix strips each extending in the second direction, and intersecting with the plurality of first black matrix strips to define, together with the plurality of first black matrix strips, a plurality of openings for accommodating the color resist layer.

In embodiments of the present disclosure, the color resist layer is formed in the recesses and in the gaps between adjacent first black matrix strips such that the color resist layer may not lap over the black matrix strips neighboring thereto. In other words, there may be substantially no overlap between the color resist of the color resist layer and the black matrix, and there is no overlap between adjacent color resists of different colors, so no crosstalk phenomenon occurs. In addition, by providing recesses in the substrate, the color resist layer is formed in a relatively deep groove between adjacent first black matrix strips due to the super-position effect of the depth of the recess and the thickness of the first black matrix strip, so that the color resist layer may be formed underneath the top of the black matrix, which may effectively avoid the problems of color shift, color crosstalk, and a poor central viewing angle.

As disclosed above and below in the present disclosure, "width" refers to a transversal dimension of an element in an orientation shown in the drawings, i.e., the transversal dimension in the direction parallel to the substrate, and "thickness" refers to a longitudinal dimension of an element in an orientation shown in the drawings, i.e., the longitudinal dimension of the element in the direction perpendicular to the substrate.

The color film substrate provided in one or more embodiments of the present disclosure is described in detail below in conjunction with the accompanying drawings.

Figure 3A:
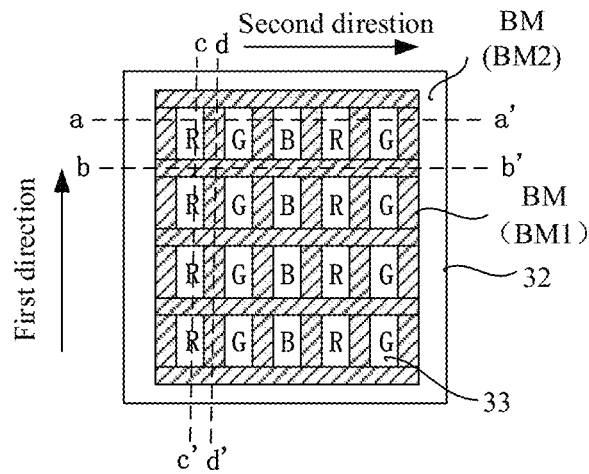
FIG. 3A schematically illustrates a plan view of a color film substrate in one or more embodiments of the present disclosure.
Figure 3B:
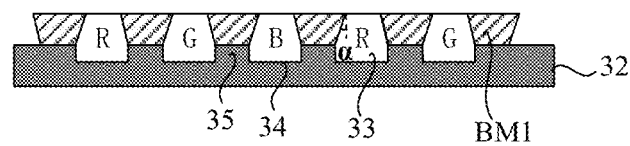
FIG. 3B schematically illustrates a cross-sectional view of the color film substrate along line aa' in FIG. 3A in one or more embodiments of the present disclosure.
Figure 3C:
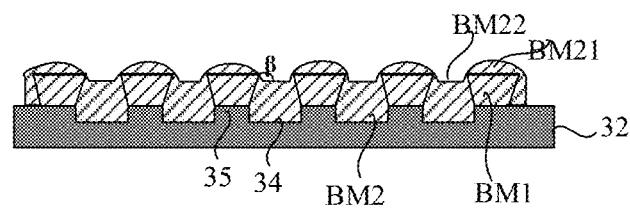
FIG. 3C schematically illustrates a cross-sectional view of the color film substrate along line bb' in FIG. 3A in one or more embodiments of the present disclosure.
Figure 3D:
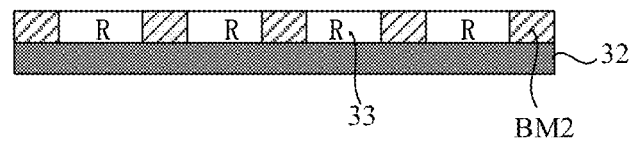
FIG. 3D schematically illustrates a cross-sectional view of the color film substrate along line cc' in FIG. 3A in one or more embodiments of the present disclosure.
Figure 3E:
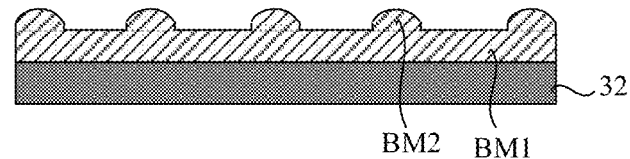
FIG. 3E schematically illustrates a cross-sectional view of the color film substrate along line dd' in FIG. 3A in one or more embodiments of the present disclosure.

FIG. 3A schematically illustrates a plan view of a color film substrate in one or more embodiments of the present disclosure, FIG. 3B schematically illustrates a cross-sectional view of the color film substrate along line aa' in FIG. 3A in one or more embodiments of the present disclosure, FIG. 3C schematically illustrates a cross-sectional view of the color film substrate along line bb' in FIG. 3A in one or more embodiments of the present disclosure, FIG. 3D schematically illustrates a cross-sectional view of the color film substrate along line cc' in FIG. 3A in one or more embodiments of the present disclosure, and FIG. 3E schematically illustrates a cross-sectional view of the color film substrate along line dd' in FIG. 3A in one or more embodiments of the present disclosure.

As shown in FIGS. 3A to 3E, the color film substrate may include a substrate 32 including a plurality of first recesses 34 each extending in a first direction and a plurality of first tabs 35 arranged alternately with the plurality of first recesses 34 in a second direction perpendicular to the first direction. In one or more embodiments of the present disclosure, the plurality of first recesses 34 and the plurality of first tabs 35 may be formed by etching the substrate 32. The plurality of first recesses 34 and the plurality of first tabs 35 extend continuously in a first direction. In an example embodiment, the first direction may be an extension direction of a data line of the display panel, and the second direction may be an extension direction of a gate line of the display panel.

In some embodiments of the present disclosure, a cross-section of each first recess 34 perpendicular to the first direction may be rectangular as shown in FIG. 3B. In an alternative embodiment, the cross-sectional shape of each first recess 34 may also be a positive trapezoid or an inverted trapezoid. However, other embodiments are also possible. For example, the cross-sectional shape of the first recess 34 may also be other regular or irregular shapes.

The etching width and density of the first recess 34 may depend on a desired size of the sub-pixel and a desired density of the sub-pixel. As an example, the width of the first recess 34 may be substantially equal to the desired width of the sub-pixel (also each color resist), and a pitch between adjacent first recesses 34 may be equal to a desired pitch between sub-pixels. In some embodiments of the present disclosure where the desired widths of the sub-pixels vary, the widths of the different first recesses 34 may vary. In an example embodiment, the width of the first recess 34 for accommodating a green color resist may be greater than the width of the first recess 34 for accommodating a red color resist and the width of the first recess 34 for accommodating a blue color resist. As an example, the width of the first recess 34 for accommodating the green color resist may be 8.0 to 11.5 µm, the width of the first recess 34 for accommodating the red color resist may be 7.3 to 10.8 µm, and the width of the first recess 34 for accommodating the blue color resist may be 7.0 to 11.0 µm.

In some embodiments of the present disclosure, the substrate 32 may be made of hard or soft materials such as glass, plastic, and the like. In an alternative embodiment, the substrate 32 may also be made of a semiconductor material.

As shown in FIG. 3A, the color film substrate may further include a plurality of first black matrix strips BM1 disposed on the plurality of first tabs 35, respectively, and extending in a first direction, and a plurality of second black matrix strips BM2 extending in a second direction, respectively, and intersecting with the plurality of first black matrix strips BM1 to define, together with the plurality of first black matrix strips BM1, a plurality of openings for accommodating the color resist layer 33. In some embodiments of the present disclosure, the plurality of first black matrix strips BM1 and the plurality of second black matrix strips BM2 may cross longitudinally and horizontally so as to form a mesh black matrix BM. The color resist layer 33 may fill the plurality of first recesses and the openings of the mesh black matrix BM so as to form sub-pixels arranged in an array.

As shown in FIG. 3B, each first black matrix strip BM1 may have a cross-section with substantial inverted trapezoid perpendicular to the first direction. That is, a surface of each first black matrix strip BM1 facing the substrate 32 may has a width less than a width of a surface of that first black matrix strip BM1 facing away from the substrate 32. In an example embodiment, a waist of the inverted trapezoidal cross-section of the first black matrix strip BM1 may have an angle of inclination a relative to a third direction perpendicular to the substrate 32 ranging from 3° to 10°. In further example embodiment, a ratio of the width of the surface of the first black matrix strip BM1 facing away from the substrate 32 to the width of the surface of the first black matrix strip BM1 facing the substrate 32 is in the range of from 1.05 to 1.73, within which the first black matrix strip BM1 having an well inverted trapezoidal cross-section may be formed, and at the same time, the color resist may be effectively confined in the recess between adjacent black matrix strips, which may prevent the color resist from peeling off. As an example, the width of the surface of the first black matrix strip BM1 facing the substrate 32 may range from 2.2 to 3.6 µm, and the width of the surface of the first black matrix strip BM1 facing away from the substrate 32 may range from 2.5 to 3.8 µm.

As used herein, the term "inverted trapezoid" is a relative term with respect to the orientation illustrated in the drawings. In an example of the present disclosure, when the color film substrate has an orientation such that the substrate 32 is disposed below the black matrix, the cross-sectional shape of the first black matrix strip BM1 is an inverted trapezoid. However, when the orientation of the color film substrate is reversed, the "inverted trapezoid" may change to a "positive trapezoid".

As further used herein, the words "substantial" or "rough" indicate that there is a small difference between the two or more elements being compared, e.g., a tolerance of less than 20%, specifically less than 10%, and more specifically less than 5%. Thus, in the present disclosure, "substantial inverted trapezoid" means that the object referred to (e.g., a cross-section of the first black matrix strip BM1 perpendicular to the first direction) is similar to an inverted trapezoid, but may not be necessarily identical to an inverted trapezoid. As an example, the side waist of the cross-section of the first black matrix strip BM1 perpendicular to the first direction may be curved or may have a small step, a small bump, a small depression, and the like.

Since the black matrix material is usually negative, the black matrix material is capable of forming an inverted trapezoidal cross-sectional shape when subjected to weak exposure and etching by the developer solution. In one or more embodiments of the present disclosure, the first black matrix strip BM1 having an inverted trapezoidal cross-sectional shape is formed on the first tab 35 of the substrate 32, and then the color resist layer is formed in the first recess 34, which may more effectively avoid the problems of color shift, color crosstalk, and poor central viewing angle.

In some embodiments, the second black matrix strip BM2 may not be provided on the same layer as the first black matrix strip BM1. In embodiments of the present disclosure, the cross-sectional shape of the second black matrix strip BM2 may not be limited. As shown in FIG. 3D, a cross-section of each second black matrix strip BM2 perpendicular to the second direction may be rectangular. In some embodiments of the present disclosure, the second black matrix strip BM2 is typically used to divide pixel of the same color in the first direction into a plurality of sub-pixels. Thus, there is generally no crosstalk in the first direction, and thus the cross-sectional shape of the second black matrix strip BM2 may be a positive trapezoidal shape. However, it will be appreciated that the cross-sectional shape of the second black matrix strip BM2 is not limited to a rectangular shape. In an alternative embodiment, the cross-sectional shape of the second black matrix strip BM2 may also be inverted trapezoidal or positive trapezoidal, and embodiments of the present disclosure are not limited thereto.

It will be appreciated that in some embodiments of the present disclosure, only a portion of the first black matrix strips BM1 may have an inverted trapezoidal cross-sectional shape while another portion of the first black matrix strips BM1 may have a positive trapezoidal cross-sectional shape, which may also have the effect of reducing color crosstalk to a certain extent.

As already described above, the plurality of first black matrix strips BM1 and the plurality of second black matrix strips BM2 intersect longitudinally and horizontally to form a mesh black matrix. Returning to reference to FIGS. 3C and 3E, each second black matrix strip BM2 may be superimposed on the plurality of first black matrix strips BM1 at positions intersecting with the plurality of first black matrix strips BM1. In manufacturing the black matrix, a first black matrix strip BM1 may be formed on the substrate 32 followed by a second black matrix strip BM2 such that the second black matrix strips BM2 are superimposed on the first black matrix strips BM1 at positions intersecting with the first black matrix strips BM1.

In one or more embodiments of the present disclosure, a thickness of the second black matrix strip BM2 may be less than a thickness of the first black matrix strip BM1 at the positions intersecting with the first black matrix strips BM1 as shown in FIGS. 3C and 3E. However, at the positions non-intersecting with the first black matrix strips BM1, the thickness of the second black matrix strip BM2 may be greater than the thickness of the first black matrix strip BM1. Since the first black matrix strip BM1 is located on the first tab 35, the second black matrix strip BM2 may have a greater thickness in order that the first black matrix strip BM1 and the second black matrix strip BM2 may have a smaller height difference. In an example embodiment, at the positions intersecting with the first black matrix strips BM1, the second black matrix strip BM2 may have a thickness of about 0.3 to 0.6 µm, and the first black matrix strip BM1 may have a thickness of about 1.0 to 1.5 µm. At the positions non-intersecting with the first black matrix strips BM1, the second black matrix strip BM2 may have a thickness of 1.2 to 1.6 µm.

In further example embodiment, a ratio of the thickness of the first black matrix strip BM1 to an etching depth of the first recess 34 may be in the range of 3.75 to 7.50, and a ratio of the thickness of the second black matrix strip BM2 (in particular the thickness of the second black matrix strip BM2 at the positions non-intersecting with the first black matrixs BM1) to the etching depth of the first recess 34 may be in the range of 6.0 to 8.0. By configuring a reasonable thickness relationship of the first black matrix strip BM1, the second black matrix strip BM2, and the first recess 34, on the one hand, it is convenient to form a desired morphology of the black matrix to avoid the black matrix from being detached or remain, and on the other hand, it is possible to securely confine the color resist into the openings defined by the first black matrix strip BM1 and the second black matrix strip BM2 to prevent the color resist from peeling off. As an example, the etching depth of the first recess 34 may be, but is not limited to, in the range of 0.2 to 0.4 µm. Accordingly, the thickness of the first tab 35 may be in the range of 0.2 to 0.4 µm.

In one or more embodiments of the present disclosure, as shown in FIG. 3C, at the positions non-intersecting with the first black matrix strips BM1, the thickness of the second black matrix strip BM2 may be less than a sum of the thickness of the first black matrix strip BM1 and the thickness of the first tab 35.

With continued reference to FIG. 3C, each second black matrix strip BM2 may include a plurality of curved portions BM21 surrounding the first black matrix strips BM1 intersecting therewith and a plurality of flat portions BM22 connecting the plurality of curved portions BM11, wherein each of the flat portions BM22 is disposed in the first recess 34 and in the gap between the adjacent first black matrix strips BM1. In some embodiments of the present disclosure, an angle β between a curved surface of the curved portion BM21 away from the substrate 32 and a surface of the flat portion BM22 away from the substrate 32 at a junction of the curved portion and the flat portion is obtuse angle. In further example embodiment, a ratio of tan (180-β° to a thickness of the planarization layer on the first black matrix strip BM1 and the second black matrix strip BM2 as described in detail below may range from 0.96 to 1.83. In this range it is possible to ensure the continuity of the mesh of the first black matrix strip BM1 and the second black matrix strip BM2 at a high PPI, and at the same time it is possible to better achieve homogeneity of the black matrix mesh as well as flatness of the color film substrate. As an example, the thickness of the planarization layer may range from 1.5 to 1.85 µm, and the obtuse angle β may be about 110° to 120°.

Returning to reference FIGS. 3A, 3B, and 3D, the color film substrate may further include a color resist layer 33 disposed in the plurality of openings defined by intersecting the plurality of first black matrix strips BM1 and the plurality of second black matrix strips BM2, and fill the plurality of first recess 34 as well as gaps among the plurality of first black matrix strips BM1.

In some embodiments of the present disclosure, the color resist layer 33 may include a red color resist R, a green color resist G, and a blue color resist B arranged sequentially alternately in the second direction. In this embodiment, the color resist layer 33 may be arranged in such a way that color resists in the same column in the first direction have the same color, while color resists in the same row in the second direction may have different colors and the red color resist R, the green color resist G, and the blue color resist B are arranged in an alternating order. In an alternative embodiment, the red color resistor R, the green color resistor G, and the blue color resistor B are arranged sequentially alternately in both the first direction and the second direction.

In one or more embodiments of the present disclosure, the thickness of the color resist layer 33 may be substantially equal to a sum of a depth of the first recess 34 and a thickness of the first black matrix strip BM1. That is, an upper surface of the color resist layer 33 may be flush with an upper surface of the first black matrix strip BM1. In a further example embodiment, a ratio of the thickness of the color resist layer 33 to the depth of the first recess 34 may range from 3.5 to 12.5. This ratio range may effectively prevent color crosstalk. In an example embodiment, the thickness of each color resist may be about 1.5 to 2.5 μm. However, in practice, the upper surface of the color resist layer 33 may be slightly lower or slightly higher than the upper surface of the first black matrix strip BM1 due to process condition.

In some embodiments of the present disclosure, each color resist of the color resist layer 33 may include two portions: a bottom portion disposed in the first recess 34 and a top portion disposed in the gap between adjacent first black matrix strips BM1. The morphological characteristic of the bottom portion may depend on the morphological characteristic of the first recess 34, while the morphological characteristic of the top portion may depend on the morphology of the first black matrix strip BM1, and thus on the morphological characteristic of the gap between adjacent first black matrix strips BM1. In an example embodiment, the cross-section of each first recess 34 in a direction perpendicular to the first direction may be rectangular, and accordingly, a cross-sectional shape of a bottom portion of each color resist may be rectangular. The cross-section of each first black matrix strip BM1 in the direction perpendicular to the first direction may be substantially inverted trapezoidal, the cross-section of the gap between two adjacent first black matrix strips BM1 may be substantially positive trapezoidal, and correspondingly, the shape of the cross-section of the top portion of each color resist may be substantially positive trapezoidal. Alternatively, however, in practice, due to limitations such as process conditions, the top portion of each color resist may not completely fill the gap between adjacent first black matrix strips BM1. As an example, a side of the top portion of each color resist does not completely fit a side waist of the inverted trapezoidal first black matrix strip BM1, making the cross-sectional shape of the top portion of each color resist appear to be of a rectangular-like shape.

In an exemplary embodiment of the present disclosure, a surface of the first black matrix strip BM1 close to the substrate 32 has a width in the second direction greater than a width, in the second direction, of the first tab 35 such that a width of the top portion of each color resist 33 between adjacent first black matrix strips BM1 is less than a width of the bottom portion in the corresponding first recess 34.

In a further example embodiment, the width of the top surface of the top portion of the red color resist R may be from about 5.7 to about 9.0 μm, and the width of the bottom portion of the red color resist R may be from about 7.3 to about 10.8 μm. The width of the top surface of the top portion of the green color resist G may be from about 6.5 to about 9.8 μm, and the width of the bottom portion of the green color resist G may be from about 8.0 to about 11.5 μm. The width of the top surface of the top portion of the blue color resist B may be from about 6.0 to about 9.8 μm, and the width of the bottom portion of the blue color resist B may be from about 7.0 to about 11.0 μm.

In the embodiment shown in FIGS. 3A to 3E of the present disclosure, each of the plurality of first tabs 35 extends continuously in the first direction, and orthographic projections of the plurality of first black matrix strips BM1 on the substrate 32 are respectively disposed on the plurality of first tabs 35 and substantially cover the respective first tabs 35. The superposition of the thickness of the first black matrix strip BM1 and the thickness of the first tab 35 enables formation of a deeper groove to be filled by the color resist layer 33. The color resist layer 33 fills the groove, and the thickness of the color resist layer 33 may be substantially equal to the sum of the depth of the first recess 34 and the thickness of the first black matrix strip BM1, such that the color resist layer 33 has sufficient thickness without overlapping with the black matrix, so there is no color crosstalk or color shift, even in the case of an oblique viewing angle.

Figure 4:
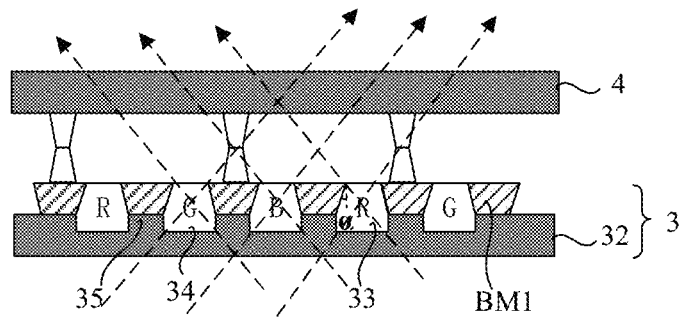
FIG. 4 schematically illustrates a light path for avoiding color crosstalk at an oblique viewing angle for the color film substrate in one or more embodiments of the present disclosure.

FIG. 4 schematically illustrates an optical path for avoiding color crosstalk at an oblique viewing angle for the color film substrate in one or more embodiments of the present disclosure. As shown in FIG. 4, in the case where the color film substrate 3 provided in accordance with embodiments of the present disclosure is cell assembled with the array substrate 4 to form a display panel, light rays from a color resist are less likely to enter the field of view of a neighboring color resist, and thus color crosstalk is less likely to occur even in the case of an oblique viewing angle.

Figure 5A:
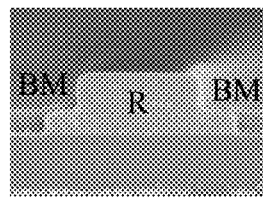
FIG. 5A schematically illustrates a cross-sectional electron micrograph of the color film substrate in one or more embodiments of the present disclosure.
Figure 5B:
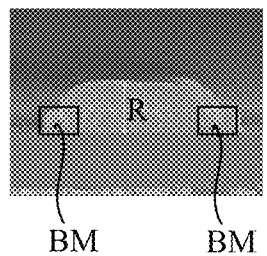
FIG. 5B schematically illustrates a cross-sectional electron micrograph of the color film substrate in the related art.

FIG. 5A schematically illustrates a cross-sectional electron micrograph of the color film substrate in one or more embodiments of the present disclosure, and FIG. 5B schematically illustrates a cross-sectional electron micrograph of the color film substrate in the related art. As shown in FIG. 5A, the top surface of the color resist layer (e.g., R color resist) of the color film substrate provided in embodiments of the present disclosure does not extend beyond the top surface of the black matrix BM. In contrast, the color resist layer (e.g., R color resist) of the color film substrate in the related art has an overlap with the black matrix BM as shown in FIG. 5B, which tends to lead to crosstalk.

Figure 6:
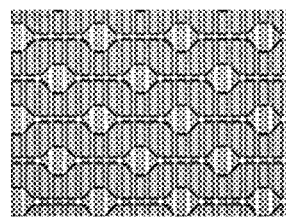
FIG. 6 schematically illustrates a planar pattern diagram of the color film substrate in one or more embodiments of the present disclosure.
Figure 7:
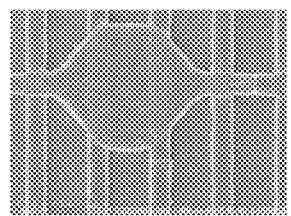
FIG. 7 schematically illustrates a planar electron micrograph of the color film substrate in one or more embodiments of the present disclosure.

FIGS. 6 and 7 schematically illustrate a planar pattern diagram and a planar electron microscope diagram, respectively, of the color film substrate in one or more embodiments of the present disclosure. As shown in FIGS. 6 and 7, both the pattern morphology and dimensional uniformity of the color film substrate provided in one or more embodiments of the present disclosure are improved. In addition, edge burrs and remains of the pattern of the color film substrate provided by the one or more embodiments of the present disclosure are also reduced to some extent.

Figure 8A:
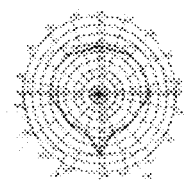
FIG. 8A schematically illustrates a simulation of a center view of the color film substrate in one or more embodiments of the present disclosure.
Figure 8B:
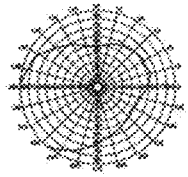
FIG. 8B schematically illustrates a simulation of a center view of the color film substrate in the related art shown in FIG. 1.

FIG. 8A schematically illustrates a simulation of a center view of the color film substrate in one or more embodiments of the present disclosure, and FIG. 8B schematically illustrates a simulation of a center view of the color film substrate shown in FIG. 1. As shown in FIG. 8A, the center viewing angle offset may be greatly improved by the color film substrate provided in one or more embodiments of the present disclosure. As shown in FIG. 8B, color film substrates in the related art have a larger center viewing angle offset.

Figure 9A:
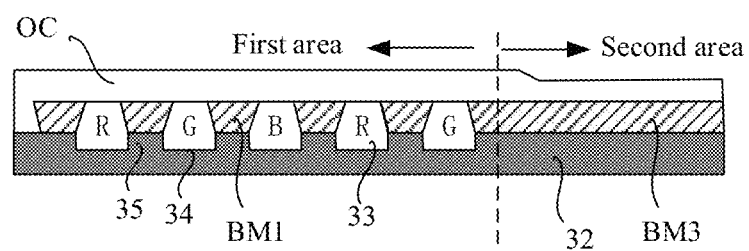
FIG. 9A schematically illustrates a cross-sectional view, in a second direction, of another color film substrate in one or more embodiments of the present disclosure.
Figure 9B:
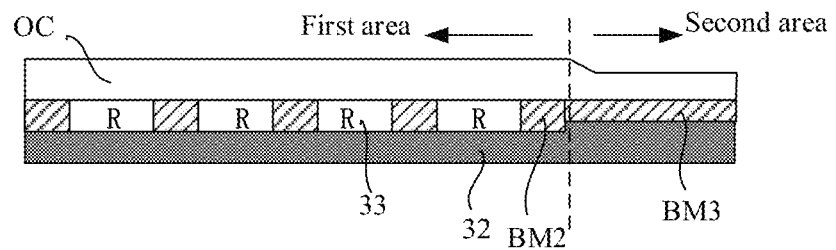
FIG. 9B schematically illustrates a cross-sectional view, in a first direction, of another color film substrate in one or more embodiments of the present disclosure.

FIG. 9A schematically illustrates a cross-sectional view, in a second direction (i.e., grid line direction), of another color film substrate in one or more embodiments of the present disclosure, and FIG. 9B schematically illustrates a cross-sectional view, in a first direction (i.e., data line direction), of another color film substrate in one or more embodiments of the present disclosure. The color film substrate illustrated in FIGS. 9A and 9B shares some similarities with the color film substrate illustrated in FIGS. 3A to 3E, and the description provided with respect to FIGS. 3A to 3E applies, as appropriate, to the color film substrate illustrated in FIGS. 9A and 9B. Accordingly, in the following description, only portions that are different from the embodiments illustrated in FIGS. 3A to 3E are described, and portions that are the same as the embodiments illustrated in FIGS. 3A to 3E are omitted.

As shown in FIGS. 9A and 9B, the substrate 32 of the color film substrate may include a first area and a second area. In an example embodiment, the first area may correspond to a display area (i.e., AA area) of the display panel, and the second area may correspond to a dummy area of the display panel.

With continued reference to FIGS. 9A and 9B, in some embodiments of the present disclosure, the plurality of first black matrix strips BM1, the plurality of second black matrix strips BM2, the plurality of first recesses 34, and the color resist layer 33 described above are arranged in the first area. The second area further includes an additional black matrix BM3 that is integrally formed with the plurality of first black matrix strips BM1 or the plurality of second black matrix strips BM2 disclosed herein. In some embodiments, the additional black matrix BM3 may be planar. In such an embodiment, no color resist may be provided in the second area, and thus the additional black matrix BM3 may not be patterned. By providing the additional black matrix BM3 throughout the second area, color resist peeling off may be avoided. In an example embodiment, in manufacturing the first black matrix strip BM1 of the color film substrate, the black matrix material may be first coated on both first area and second area of the substrate 32, and then a pattern of the plurality of first black matrix strips BM1 may be formed in the first area through processes such as exposure and development, and the additional black matrix BM3 in the second area may be not patterned, but remain on the second area in a form of a continuous plane. In an alternative embodiment, the additional black matrix BM3 on the second area may also be patterned to have the same pattern as the first black matrix strips BM1 or the second black matrix strips BM2. In this embodiment, a color resist may be provided in the opening of the patterned black matrix BM3 to ensure pattern homogeneity of the first area and the second area.

In some embodiments of the present disclosure, the color film substrate may further include a planarization layer OC on the plurality of first black matrix strips BM1, the plurality of second black matrix strips BM2, and the color resist layer 33. As shown in FIGS. 9A and 9B, the planarization layer OC may extend over both the first and second areas to cover the plurality of first black matrix strips BM1, the plurality of second black matrix strips BM2, and the color resist layer 33 on the first area and the additional black matrix BM3 on the second area.

In one or more embodiments of the present disclosure, a thickness of the planarization layer OC in the first area may be greater than a thickness of the planarization layer OC in the second area, and thus, the planarization layer OC may have a thickness segment difference in a transition area from the first area to the second area. As an example, the thickness segment difference may be about 0.1 to 0.2 μm.

In the first area, the second black matrix strip BM2 is superimposed on the first black matrix strips BM1 at the positions intersecting with the first black matrix strips BM1, resulting in a total thickness of the respective film layers of the color film substrate at the intersecting positions being greater than the thickness at the non-intersecting positions, and thus the second black matrix strip BM2 has a plurality of bumps in the direction away from the substrate 32 at the intersecting positions. In addition, a top surface of the color resist formed in the first recess 34 and in the gap between adjacent first black matrix strips BM1 may also extend beyond the top surface of the first black matrix strip BM1 due to the process conditions, and thus a plurality of raised structures may also be formed. The planarization layer OC has a greater thickness in the first area so as to cover these bumps, causing a side of the color film substrate toward the array substrate to be flattened. In the second area, the planarization layer OC may have a thinner thickness because the additional black matrix BM3 is made in a form of a continuous plane, there is no color resist layer in the second area, and the additional black matrix BM3 is relatively flat.

Figure 10A:
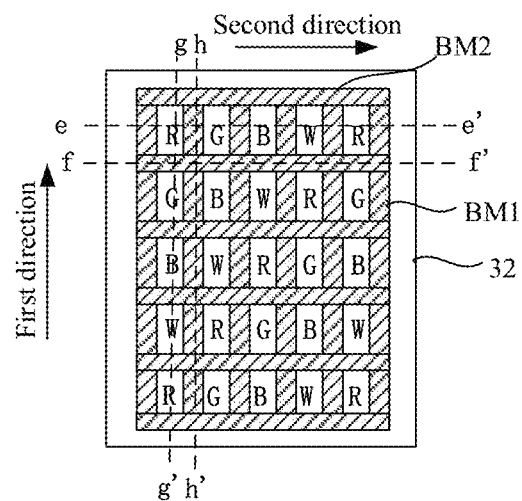
FIG. 10A schematically illustrates a plan view of yet another color film substrate in one or more embodiments of the present disclosure.
Figure 10B:
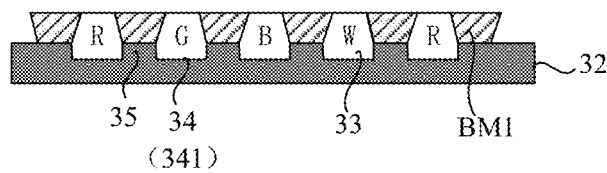
FIG. 10B schematically illustrates a cross-sectional view of the color film substrate along line ee' in FIG. 10A in one or more embodiments of the present disclosure.
Figure 10C:
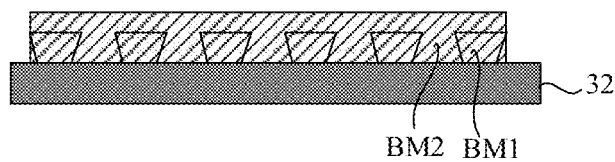
FIG. 10C schematically illustrates a cross-sectional view of the color film substrate along line ff in FIG. 10A in one or more embodiments of the present disclosure.
Figure 10D:
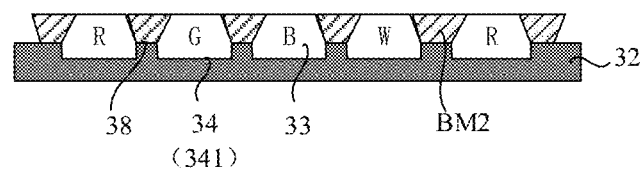
FIG. 10D schematically illustrates a cross-sectional view of the color film substrate along line gg' in FIG. 10A in one or more embodiments of the present disclosure.
Figure 10E:
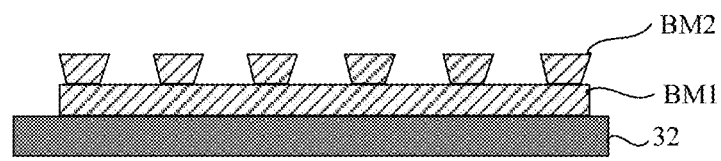
FIG. 10E schematically illustrates a cross-sectional view of the color film substrate along line hh' in FIG. 10A in one or more embodiments of the present disclosure.

FIG. 10A schematically illustrates a plan view of yet another color film substrate in one or more embodiments of the present disclosure, FIG. 10B schematically illustrates a cross-sectional view of the color film substrate along line ee' in FIG. 10A in one or more embodiments of the present disclosure, FIG. 10C schematically illustrates a cross-sectional view of the color film substrate along line ff 'in FIG. 10A in one or more embodiments of the present disclosure, FIG. 10D schematically illustrates a cross-sectional view of the color film substrate along line gg' in FIG. 10A in one or more embodiments of the present disclosure, and FIG. 10E schematically illustrates a cross-sectional view of the color film substrate along line hh' in FIG. 10A in one or more embodiments of the present disclosure. The color film substrate illustrated in FIGS. 10A to 10E shares some similarities with the color film substrate illustrated in FIGS. 3A to 3E, and the description provided with respect to FIGS. 3A to 3E applies, as appropriate, to the color film substrate illustrated in FIGS. 10A to 10E. Accordingly, in the following description, only portions that are different from the embodiments illustrated in FIGS. 3A to 3E are described, and portions that are the same as the embodiments illustrated in FIGS. 3A to 3E are omitted.

Unlike the embodiment shown in FIGS. 3A to 3E in which the color resist layer includes a red color resist R, a green color resist G, and a blue color resist B, in the embodiment shown in FIGS. 10A to 10E, the color resist layer may include a red color resist R, a green color resist G, a blue color resist B, and a white color resist W. More specifically, the embodiment shown in FIGS. 10A to 10E may be adapted to RGBW display panels with high PPI. However, it should be understood that the embodiment shown in FIGS. 10A to 10E is also applicable to display panel with other color resist arrangement. For example, the embodiment shown in FIGS. 10A to 10E is also applicable to RGB display panel in the embodiment described with respect to FIGS. 3A to 3E, and the present disclosure is not particularly limited thereto.

Further unlike the embodiment shown in FIGS. 3A to 3E in which the substrate 32 only has the plurality of first tabs in the first direction but no tabs in the second direction, in the embodiment shown in FIGS. 10A to 10E, the substrate 32 may further include a plurality of second tabs 38 that each extend in the second direction. In this embodiment, the plurality of second tabs 38 intersect with the plurality of first tabs 35 such hat each first recess 34 is divided by the plurality of second tabs 38 into a plurality of separated first sub-recesses 341. In this embodiment, the plurality of first tabs 35 and the plurality of second tabs 38 are formed by etching the substrate 32 and thereby forming the plurality of first sub-recesses 341, and the positions and the dimensions of the plurality of first sub-recesses 341 may correspond to the desired positions and dimensions of the pixels to be formed (corresponding to the color resist R, the color resist G, the color resist B, and may be the color resist W).

In the embodiment, the plurality of second black matrix strips BM2 are disposed on the plurality of second tabs 38, respectively, and the individual color resists are respectively disposed in the plurality of first sub-grooves 341 and in the plurality of openings defined by the plurality of first black matrix strips BM1 and the plurality of second black matrix strips BM2.

As shown in FIGS. 10B and 10D, similar to the first black matrix strip BM1, a cross-section of the second black matrix strip BM2 perpendicular to the second direction may be inverted trapezoidal. In other words, a width of a surface of the second black matrix strip BM2 close to the substrate 32 may be smaller than a width of a surface of the second black matrix strip BM2 away from the substrate 32. The first and second black matrix strips BM1 and BM2 are disposed on the first tab 35 and the second tab 38, respectively.

With this configuration, a deeper space for accommodating the color resist may be formed. As a result, it is possible to effectively prevent the problem of easy peeling off of the color resist pattern caused by the small size of the color resists of the high PPI product (e.g., the RGBW product), due to the fact that the recesses and the inverted trapezoidal shape of the black matrix strips may form a zipper effect on the color resists which may enhance the adhesion of the color resists on the substrate 32. In addition, as has been described previously, the color resist formed in the recess may effectively prevent the problem of color mixing or light leakage between adjacent pixels.

It should be noted that an upper surface of the second black matrix strip BM2 is shown to be planar as shown in FIG. 10C. However, in practice, the upper surface of the second black matrix strip BM2 may be non-planar due to process conditions, for example, the upper surface of the second black matrix strip BM2 may have a depression toward the substrate at a position between adjacent first black matrix strips BM1.

Figure 11A:
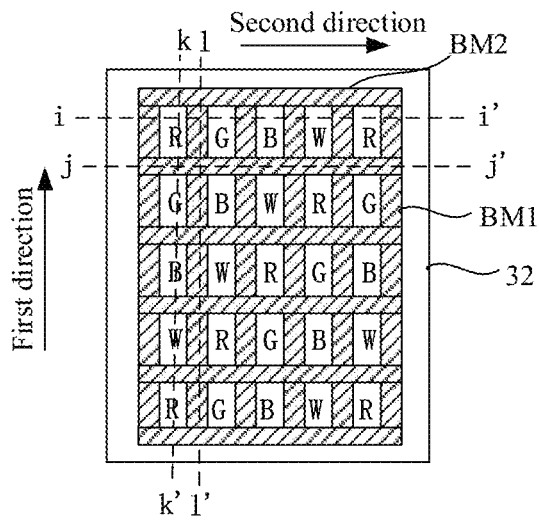
FIG. 11A schematically illustrates a plan view of still another color film substrate in one or more embodiments of the present disclosure.
Figure 11B:
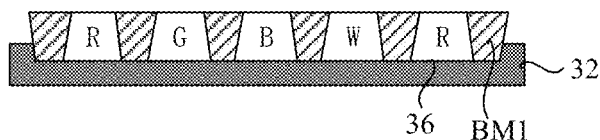
FIG. 11B schematically illustrates a cross-sectional view of the color film substrate along line ii' in FIG. 11A in one or more embodiments of the present disclosure.
Figure 11C:
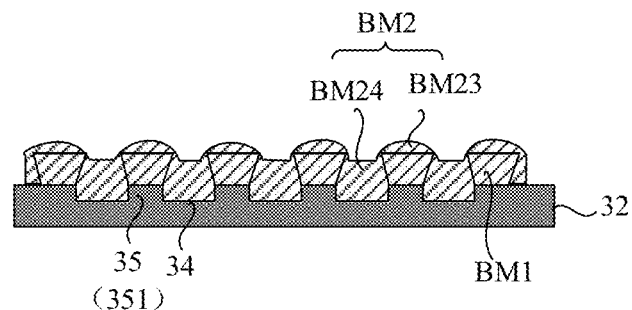
FIG. 11C schematically illustrates a cross-sectional view of the color film substrate along line jj' in FIG. 11A in one or more embodiments of the present disclosure.
Figure 11D:
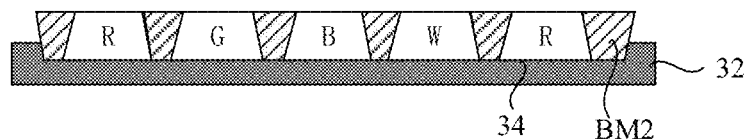
FIG. 11D schematically illustrates a cross-sectional view of the color film substrate along line kk' in FIG. 11A in one or more embodiments of the present disclosure.
Figure 11E:
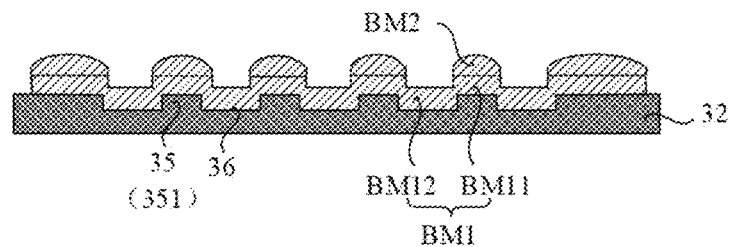
FIG. 11E schematically illustrates a cross-sectional view of the color film substrate along line ll' in FIG. 11A in one or more embodiments of the present disclosure.

FIG. 11A schematically illustrates a plan view of still another color film substrate in one or more embodiments of the present disclosure, FIG. 11B schematically illustrates a cross-sectional view of the color film substrate along line ii' in FIG. 11A in one or more embodiments of the present disclosure, FIG. 11C schematically illustrates a cross-sectional view of the color film substrate along line jj in FIG. 11A in one or more embodiments of the present disclosure, FIG. 11D schematically illustrates a cross-sectional view of the color film substrate along line kk' in FIG. 11A in one or more embodiments of the present disclosure, and FIG. 11E schematically illustrates a cross-sectional view of a color film substrate along line ll' in FIG. 11A in one or more embodiments of the present disclosure. The color film substrate illustrated in FIGS. 11A to 11E shares some similarities with the color film substrate illustrated in FIGS. 10A to 10E, and the description provided with respect to FIGS. 10A to 10E applies, as appropriate, to the color film substrate illustrated in FIGS. 11A to 11E. Accordingly, in the following description, only portions of the embodiment that are different from the embodiment illustrated in FIGS. 10A to 10E are described, and portions that are the same as the embodiment illustrated in FIGS. 10A to 10E are omitted.

In the embodiment shown in FIGS. 11A to 11E, the color resist layer may likewise include a red color resist R, a green color resist G, a blue color resist B, and a white color resist W. However, it should be understood that the embodiment shown in FIGS. 11A to 11E is also applicable to display panel with other color resist arrangement. For example, the embodiment shown in FIGS. 11A to 11E is also applicable to the RGB display panel in the embodiment described with respect to FIGS. 3A to 3E, and the present disclosure is not particularly limited thereto.

Unlike the embodiment shown in FIGS. 10A to 10E in which the substrate 32 has only the plurality of recesses in the first direction but no recesses in the second direction, in the embodiment shown in FIGS. 11A to 11E, the substrate 32 may further include a plurality of second recesses 36 extending in the second direction, respectively, but there is no second tab 38 in the second direction. The positions of the second recesses 36 correspond to the positions of the color resists. That is, orthographic projections of the color resists on the substrate is located in the second recesses, respectively. In the embodiment, each of the plurality of first tabs 35 is truncated by the plurality of second recesses 36 into a plurality of raised islands 351. Specifically, the plurality of tabs 351 are respectively disposed at positions where the first black matrix strips BM1 and the second black matrix strips BM2 intersects.

As shown in FIG. 11E, each of the plurality of first black matrix strips BM1 may include a first portion BM11 on the plurality of raised islands 351 and a second portion BM12 in the plurality of second recesses 36. As shown in FIG. 11C, each of the plurality of second black matrix strips BM2 may include a third portion BM23 on the plurality of first black matrix strips BM1 and a fourth portion BM24 in the plurality of first recesses 34. In some embodiments, a thickness of the first portion BM11 may be less than a thickness of the second portion BM12 and a thickness of the third portion BM23 may be less than a thickness of the fourth portion BM24 due to the fluidity of the materials of the first black matrix strips BM1 and the second black matrix strips BM2.

FIGS. 11C and 11E show that the upper surface of the second black matrix strip BM2 is non-planar. It will be appreciated, however, that the upper surface of the second black matrix strip BM2 may also be planar in the case where the process condition permits.

As shown in FIGS. 11B and 11D, similar to the first black matrix strip BM1, a cross-section of the second black matrix strip BM2 perpendicular to the second direction may be inverted trapezoidal. In other words, a width of a surface of the second black matrix strip BM2 close to the substrate 32 may be less than a width of a surface of the second black matrix strip BM2 away from the substrate 32.

In the embodiment shown in FIGS. 11A to 11E, the substrate 32 has recesses in both the first direction and the second direction, and the cross-sections of the black matrix strips in both directions are inverted trapezoidal, which may effectively prevent the problem of easy peeling off of the color resist pattern caused by the small size of the color resists of the high PPI product (e.g., the RGBW product), due to the fact that by the recesses and the inverted trapezoidal shape of the black matrix strips may form a zipper effect on the color resist, which may enhance the adhesion of the color resists on the substrate 32. In addition, as has been described previously, the color resist formed in the recess may effectively prevent the problem of color mixing or light leakage between adjacent pixels.

Figure 12A:
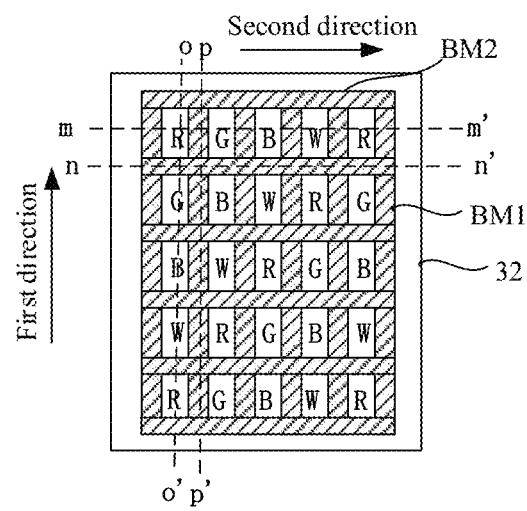
FIG. 12A schematically illustrates a plan view of yet still another color film substrate in one or more embodiments of the present disclosure.
Figure 12B:
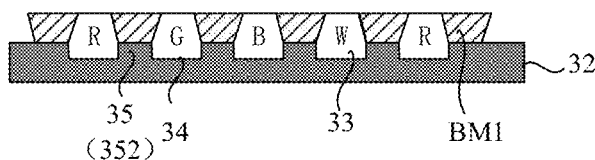
FIG. 12B schematically illustrates a cross-sectional view of the color film substrate along line mm' in FIG. 12A in one or more embodiments of the present disclosure.
Figure 12C:
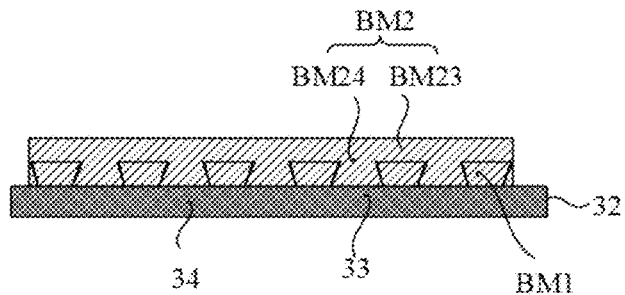
FIG. 12C schematically illustrates a cross-sectional view of the color film substrate along nn' line in FIG. 12A in one or more embodiments of the present disclosure.

FIG. 12A schematically illustrates a plan view of yet another color film substrate in one or more embodiments of the present disclosure, FIG. 12B schematically illustrates a cross-sectional view of the color film substrate along line mm' in FIG. 12A in one or more embodiments of the present disclosure, FIG. 12C schematically illustrates a cross-sectional view of the color film substrate along line nn 'in FIG.

Figure 12D:
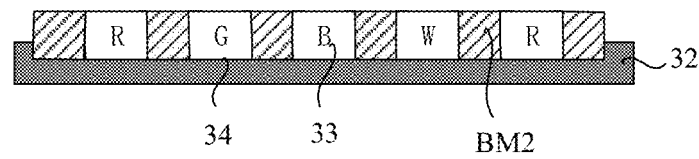
FIG. 12D schematically illustrates a cross-sectional view of the color film substrate along line oo' in FIG. 12A in one or more embodiments of the present disclosure.
Figure 12E:
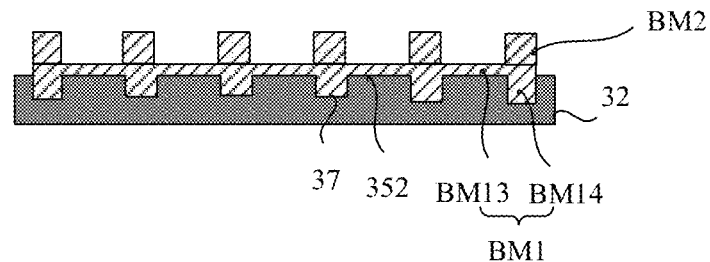
FIG. 12E schematically illustrates a cross-sectional view of the color film substrate along line pp' in FIG. 12A in one or more embodiments of the present disclosure.

12A in one or more embodiments of the present disclosure, FIG. 12D schematically illustrates a cross-sectional view of the color film substrate along line oo' in FIG. 12A in one or more embodiments of the present disclosure, and FIG. 12E schematically illustrates a cross-sectional view of the color film substrate along line pp' in FIG. 12A in one or more embodiments of the present disclosure. The color film substrate illustrated in FIGS. 12A to 12E shares some similarities with the color film substrate illustrated in FIGS. 11A to 11E, and the description provided with respect to FIGS. 11A to 11E applies, as appropriate, to the color film substrate illustrated in FIGS. 12A to 12E. Accordingly, in the following description, only portions that are different from the embodiment illustrated in FIGS. 11A to 11E are described, and portions that are the same as the embodiment illustrated in FIGS. 11A to 11E are omitted.

Unlike the embodiment shown in FIGS. 11A to 11E in which the second recess 36 is provided between adjacent second black matrix strips BM2 and the plurality of color resists are located in the plurality of second recesses, respectively, in the embodiment shown in FIGS. 12A to 12E, the plurality of second recesses 37 are provided at a positions where the plurality of second black matrix strips BM2 are disposed, i.e., the orthographic projections of the plurality of second black matrix strips BM2 is in the plurality of second recesses 37. In this embodiment, each of the plurality of first tabs 35 is divided by the second recess 37 into a plurality of separated second sub-tabs 352. The color resists 33 may be disposed in the gaps among the sub-tabs 352. As shown in FIG. 12E, each of the plurality of first black matrix strips BM1 may include a fifth portion BM13 disposed on the plurality of sub-taps 352 and a sixth portion BM14 disposed in the plurality of second recesses 37. As shown in FIG. 12C, each of the plurality of second black matrix strips BM2 may include a seventh portion BM23 disposed on the plurality of first black matrix strips BM1 and a seventh portion BM23 disposed between adjacent first black matrix strips BM1. As shown in FIGS. 12B and 12D, the first black matrix strip BM1 has an inverted trapezoidal cross-section in the second direction, and the second black matrix strip BM2 may also have an inverted trapezoidal cross-section in the first direction.

With this configuration, a zipper effect on the color resists may likewise be formed by mean of the recesses and the inverted trapezoidal shapes of the black matrix strips, which may enhance the adhesion of the color resist on the substrate 32, and therefore prevent the color resist from peeling off.

It should be noted that the upper surface of the second black matrix strip BM2 is shown to be planar as shown in FIG. 12C. However, in practice, the upper surface of the second black matrix strip BM2 may be non-planar due to process conditions, for example, the upper surface of the second black matrix strip BM2 may have a depression toward the substrate at a position between adjacent first black matrix strips BM1. Similarly, the upper surface of the first black matrix strip BM1 is shown to be planar as shown in FIG. 12E. However, in practice, the upper surface of the first black matrix strip BM1 may be non-planar due to process conditions, for example, the upper surface of the first black matrix strip BM1 may have a depression toward the substrate at a position corresponding to the second recess 37.

It should further be noted that in the embodiments illustrated in the accompanying drawings of the present disclosure, the outermost first black matrix strip BM1 and/or the second black matrix strip BM2 are shown as not being aligned with the edge of the substrate 32, but rather having a distance from the edge of the substrate, and, correspondingly, the first recess 34 and/or the second recess 36 are not connected to the edge of the substrate, but rather as being disposed in the internal area of the substrate. However, it should be understood that this is merely exemplary, and in an alternative embodiment, the outermost first black matrix strip BM1 and/or the second black matrix strip BM2 may be provided as being aligned with the edge of the substrate, and the first recess 34 and/or the second recess 36 are connected to the edge of the substrate such that the first recess 34 and/or the second recess 36 extends cross the entire width or length of the substrate 32.

In yet another aspect of the present disclosure, a display panel is further provided. The display panel may include at least one color film substrate according to the present disclosure, such as at least one color film substrate according to one or more embodiments disclosed in more detail above and/or below. Thus, for example embodiments of the display panel, reference may be made to embodiments of the color film substrate.

Figure 13:
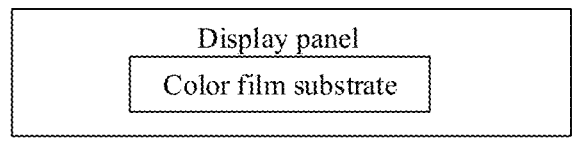
FIG. 13 schematically illustrates a block diagram of a display panel in one or more embodiments of the present disclosure.

FIG. 13 schematically illustrates a block diagram of a display panel in one or more embodiments of the present disclosure. As shown in FIG. 13, the display panel may include a color film substrate in any of the embodiments described with respect to FIGS. 3A to 3E, FIGS. 9A to 9B, FIGS. 10A to 10E, FIGS. 11A to 11E, or FIGS. 12A to 12E.

Figure 14:
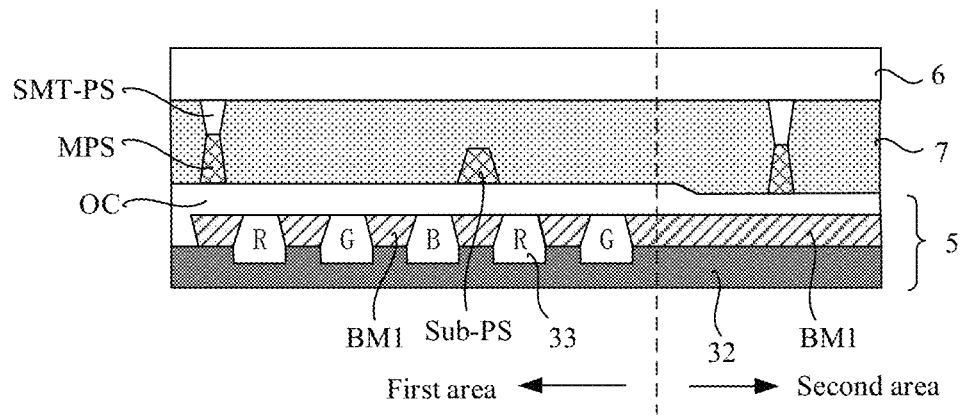
FIG. 14 schematically illustrates a cross-sectional view of a display panel in one or more embodiments of the present disclosure.

FIG. 14 schematically illustrates a cross-sectional view of a display panel in one or more embodiments of the present disclosure. As shown in FIG. 14, the display panel may include a color film substrate 5, which may be, for example, the color film substrate shown in FIGS. 9A and 9B, and thus, for example embodiments of the display panel, reference may be made to the embodiments of the color film substrate shown in FIGS. 9A and 9B. In an alternative embodiment, the color film substrate 5 may also be the color film substrate in any of the embodiments described with respect to FIG. 3A to FIGS. 3E, FIGS. 10A to 10E, FIGS. 11A to 11E, or FIGS. 12A to 12E. The following is a detailed description of the display panel including the color film substrate shown in FIGS. 9A and 9B as an example.

Continuing to refer to FIG. 14, the display panel may further include an array substrate 6 opposite the color film substrate 5, and a liquid crystal layer 7 between the color film substrate 5 and the array substrate 6. With respect to the specific embodiments of the array substrate 6 and the liquid crystal layer 7, the person skilled in the art may adopt any configuration known in the art as needed, and the present disclosure is not specifically limited thereto. As an example, the array substrate may include an array of thin-film transistors, corresponding drive driver circuitries, and other desired electronic components or wires.

In this embodiment, a plurality of spacers may be formed on the color film substrate 5 and the array substrate 6, respectively, in order to form a space for accommodating the liquid crystal layer 7 after the color film substrate 5 and the array substrate 6 being cell assembled. The spacers on the color film substrate 5 may include at least one main spacer MPS and at least one sub-spacer Sub-PS, and the spacers on the array substrate 6 may include at least one opposing spacer SMT PS that is abutted against the at least one main spacer MPS on the color film substrate 5 to form a space for accommodating the liquid crystal layer 7 after the color film substrate 5 and the array substrate 6 being cell assembled. In one or more embodiments of the present disclosure, the at least one sub-spacer Sub-PS may have a height that is less than a height of the at least one main spacer MPS. The at least one sub-spacer Sub-PS may be used to buffer external pressure on the display panel and act as an auxiliary support to ensure uniformity of the liquid crystals inside the cell.

In some embodiments of the present disclosure, as described above, the thickness of the planarization layer OC of the color film substrate 5 in the first area (e.g., the display area) is greater than that in the second area (e.g., the dummy area), which results in the cell gap in the first area being smaller than the cell gap in the second area after the color film substrate 5 is cell assembled with the array substrate 6.

In some embodiments, the at least one main spacer may include at least one first main spacer in the first area and at least one second main spacer in the second area, and the at least one first main spacer has a thickness less than a thickness of the at least one second main spacer. The at least one opposing spacer including at least one first opposing spacer in the first area and at least one second opposing spacer in the second area, and the at least one first opposing spacer has a thickness less than a thickness of the at least one second opposing spacer.

In an example embodiment of the present disclosure, the cell gap between the color film substrate 5 and the array substrate 6 in the first area may be about 1.5 to 1.8 µm. The thickness of the main spacers MPS in both the first area and the second area may be the same, for example, about 1.2 to 1.7 µm. The thickness of the sub-spacer Sub-PS may be about 0.8 to 1.3 µm. The thickness of the opposing spacer SMT PS in the first area may be about 0.5 to 1.0 µm, and the thickness of the counter-spacer SMT PS in the second area may be about 0.7 to 1.2 µm.

Figure 15:
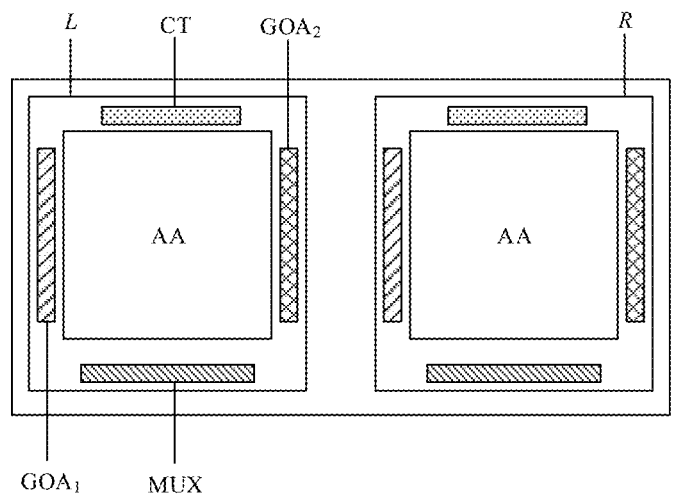
FIG. 15 schematically illustrates a virtual reality or augmented reality glass using a display device according to one or more embodiments of the present disclosure.
Figure 16:
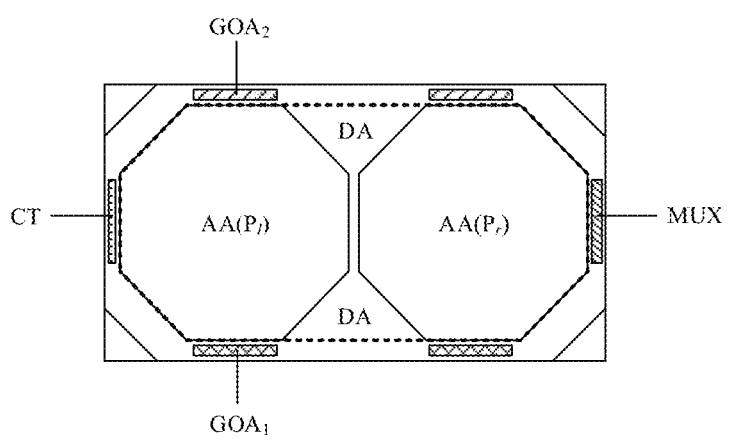
FIG. 16 schematically illustrates another virtual reality or augmented reality glass using a display device according to one or more embodiments of the present disclosure.

The display device provided by one or more embodiments of the present disclosure may be used in a near-eye display device (e.g., in virtual reality or augmented reality glasses). FIGS. 15 and 16 schematically illustrate virtual reality or augmented reality glasses using the display device according to one or more embodiments of the present disclosure, respectively.

The virtual reality glasses shown in FIG. 15 include two displays L, R that provide different pictures for the left eye and the right eye to realize a virtual reality display. The two displays L, R each include the above-described display panels provided by embodiments of the present disclosure.

The virtual reality glasses shown in FIG. 16 include a display panel, which has a display area AA including an effective pixel that may display an image, and a dummy area DA including a dummy pixel that may not display the image, and the dummy pixel is used to prevent the film layer of the effective pixel from breaking. The display area AA may include a left eye pixel area $P_l$ and a right eye pixel area $P_r$, which display different images respectively to realize the virtual reality display. In some embodiments, the left eye pixel area $P_l$ and the right eye pixel area $P_r$ are positive octagonal shapes, and the display area AA is an octagonal shape, and of course, the left eye pixel area $P_l$, the right eye pixel area $P_r$, and the display area AA may have other shapes, which are not specifically limited herein.

Continuing to refer to FIGS. 15 and 16, the virtual reality glasses may further include a first gate drive circuit $GOA_1$, a second gate drive circuit $GOA_2$, a test circuit CT, and a multiplexing selection circuit MUX disposed around the display area AA. The other necessary components in the virtual reality glasses are all understood by a person of ordinary skill in the art, will not be repeated herein, and shall not be taken as a limitation of the present disclosure.

In still yet another aspect of the present disclosure, a method for preparing a color film substrate is further disclosed. The method may manufacture at least one color film substrate according to the present disclosure, such as at least one color film substrate according to one or more embodiments disclosed in detail above. Thus, for example embodiments of the method, reference may be made to embodiments of color film substrates. The method may include the following steps, which may be performed in a given order or in a different order. Furthermore, additional method steps not listed may be provided. Furthermore, two or more or even all of the method steps may be performed at least partially simultaneously. In addition, the method steps may be repeated twice or even more than twice.

The method steps for manufacturing the color film substrate shown in FIGS. 3A to 3E are described in detail below. For the method for manufacturing the color film substrates described in other embodiments disclosed herein, the person skilled in the art may appropriately adjust the relevant method steps as needed.

In one or more embodiments of the present disclosure, the method for manufacturing the color film substrate may include providing a substrate 32, forming on the substrate 32 a plurality of first recesses 34 extending in a first direction respectively, thereby forming a plurality of first tabs 35 arranged alternately with the plurality of first recesses 34 in a second direction perpendicular to the first direction, forming a plurality of first black matrix strips BM1 extending in the first direction such that the plurality of first black matrix strips BM1 are at least partially disposed on the plurality of first tabs 35, and forming a color resist layer 33 in the plurality of first recesses 34 and in the gaps among the plurality of first black matrix strips BM1. The method further includes forming a plurality of second black matrix strips BM2 extending in the second direction such that the plurality of second black matrix strips BM2 intersect with the plurality of first black matrix strips BM1, to define, together with the plurality of first black matrix strips BM1, a plurality of openings for accommodating the color resist layer 33.

Figure 17:
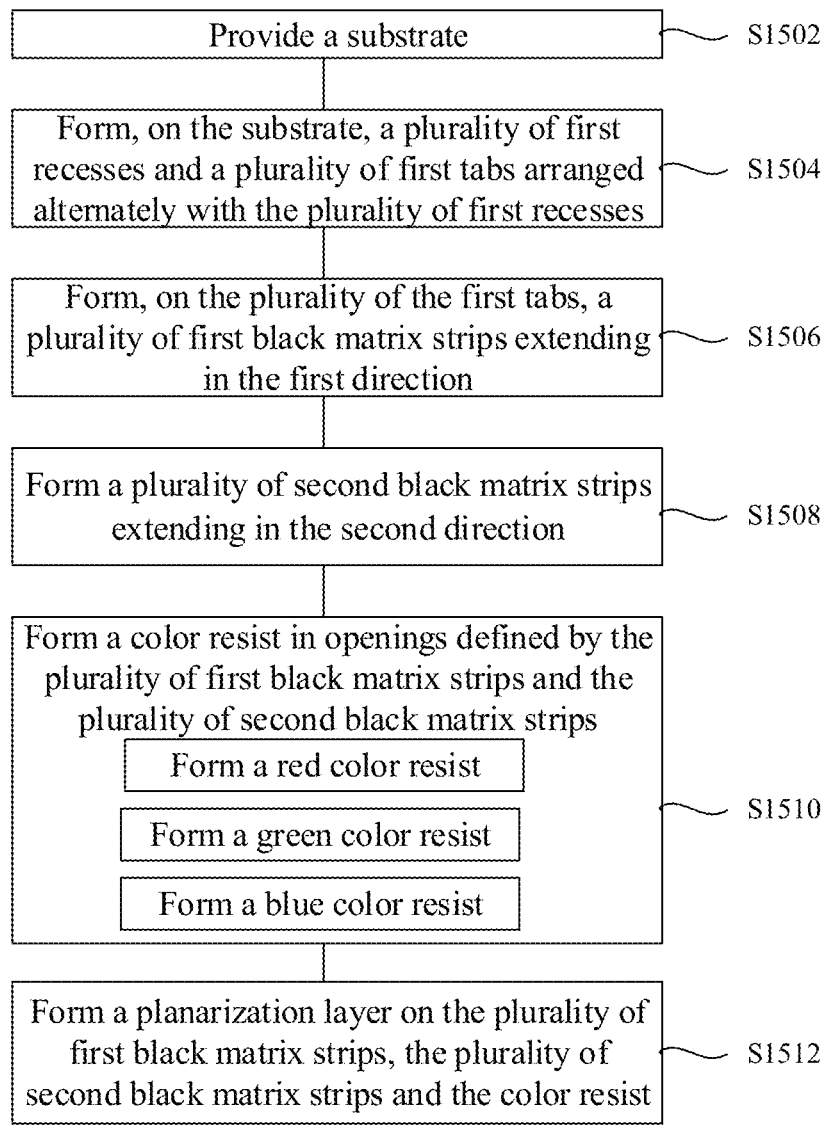
FIG. 17 schematically illustrates a flowchart of a method for manufacturing a color film substrate in one or more embodiments of the present disclosure.

FIG. 17 schematically illustrates a flowchart of a method for manufacturing a color film substrate in one or more embodiments of the present disclosure. As shown in FIG. 17, the method for manufacturing a color film substrate may include steps S1502 to S1512.

At step S1502, a substrate 32 is provided. The substrate 32 may be made of hard or soft materials such as glass, plastic.

In one or more embodiments of the present disclosure, at least one color film substrate may be manufactured on a single substrate 32. In the case where a single color film substrate is manufactured on the single substrate 32, excess portion beyond the color film substrate may be cut away after the preparation is complete to form the color film substrate. In the case where a plurality of color film substrates are manufactured on the single substrate, the plurality of color film substrates on the single substrate may be cut off, thereby separating a plurality of individual color film substrates.

At step S1504, a plurality of first recesses 34 extending respectively in a first direction are formed on the substrate 32, thereby forming a plurality of tabs arranged alternately with the plurality of first recesses 34 in a second direction perpendicular to the first direction. In one or more embodiments of the present disclosure, the plurality of first recesses 34 and the plurality of first tabs 35 may be formed by etching the substrate 32. The etching width, depth, and density of the first recesses 34 may depend on the desired size parameters of the sub-pixels of the display product.

At step S1506, a plurality of first black matrix strips BM1 extending in the first direction are formed on the plurality of first tabs 35. In this step, a black matrix material may be coated on the substrate 32, and then the black matrix material is subjected to a process of exposure and development to cause the black matrix material to be patterned as the plurality of first black matrix strips BM1 extending in the first direction disposed on the plurality of first tabs 35.

In some embodiments of the present disclosure, since the black matrix material is usually negative, it is easy to form an inverted trapezoidal cross-sectional shape when subjected to weak exposure and etching by the developer solution. Therefore, the first black matrix strip BM1 may be formed to have an inverted trapezoidal cross-section of the first black matrix strip BM1 perpendicular to the first direction. This inverted trapezoidal cross-sectional shape of the first black matrix strip BM1 may define the color resist layer to be formed in the gap between adjacent first black matrix strips BM1, and thus is capable of preventing crosstalk.

At step S1508, a plurality of second black matrix strips BM2 extending in the second direction are formed such that the plurality of second black matrix strips BM2 intersect with the plurality of first black matrix strips BM1 to define, together with the plurality of first black matrix strips BM1, a plurality of openings for accommodating the color resist. In one or more embodiments of the present disclosure, similar to forming the plurality of first black matrix strips BM1, a black matrix material may be coated on the substrate 32, and then the black matrix material may be patterned as the plurality of second black matrix strips BM2 by a process such as exposure and development, etc. Unlike the first black matrix strips BM1, the second black matrix strips BM2 may have a trapezoid cross-section in the first direction. And, at the positions intersecting with the first black matrix strips BM1, the second black matrix strip BM2 may be superimposed on the first black matrix strips BM1.

At step S1510, a color resist layer is formed in the openings defined by the plurality of first black matrix strips BM1 and the plurality of second black matrix strips BM2 such that the color resist layer fills the first recess 34 and the gaps between the adjacent first black matrix strips. In a specific embodiment, a red color resist, a green color resist, and a blue color resist may be formed sequentially.

In an alternative embodiment, steps S1510 and S1508 may be interchangeable. That is, the color resist layer may be formed in the first recesses 34 and in the gaps between adjacent first black matrix strips prior to forming the plurality of second black matrix strips BM2 extending in the second direction.

At step S1512, a planarization layer is formed over the plurality of first black matrix strips BM1, the plurality of second black matrix strips BM2, and the color resist layer.

In some example embodiments, the method for manufacturing the color film substrate may further include the steps of forming a main spacer and a sub-spacer, as well as other desired steps.

The flowchart depicted in this disclosure is merely an example. Many variations of the flowchart or the steps depicted therein may exist without departing from the spirit of the present disclosure. For example, the steps described may be performed in a different order, or steps may be added, deleted, or modified. These variations are all considered to be a part of the claimed aspect.

Exemplary Color Film Substrate

Figure 18A:
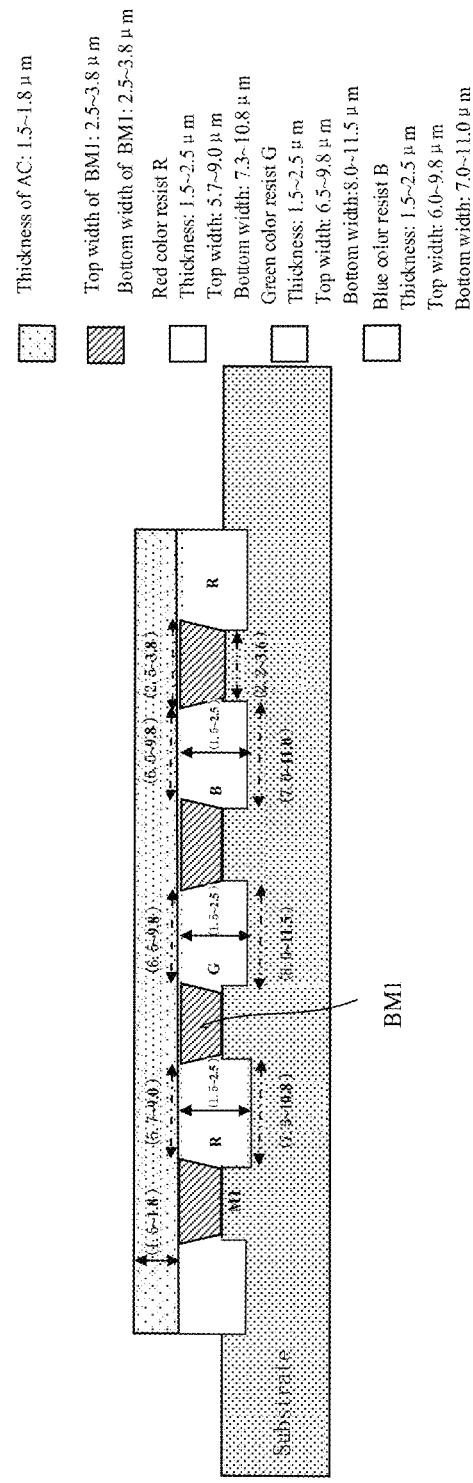
FIG. 18A schematically illustrates a cross-sectional view of a non-intersecting position of a first black matrix strip BM1 and a second black matrix strip BM2 in a direction perpendicular to a data line, and associated parameters, of a color film substrate according to one or more embodiments of the present disclosure.
Figure 18B:
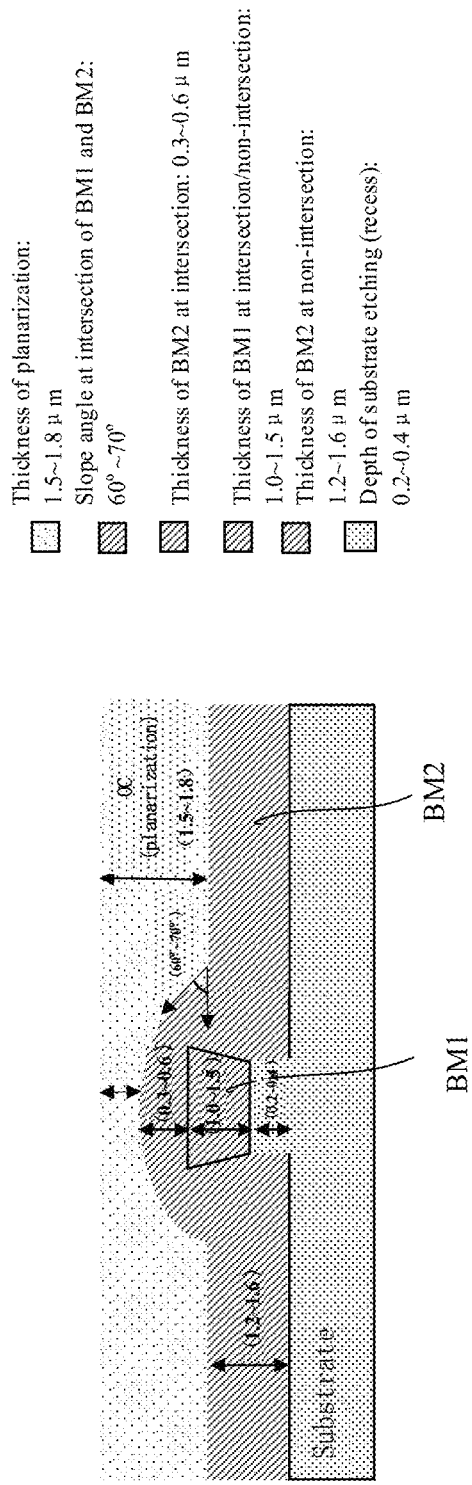
FIG. 18B is a cross-sectional view of an intersecting position of the first black matrix strip BM1 and the second black matrix strip BM2 in a direction perpendicular to a data line, and related parameters, of a color film substrate according to one or more embodiments of the present disclosure.

Parameter ranges for components of an exemplary color film substrate according to embodiments of the present disclosure are described as follow in conjunction with FIGS. 18A and 18B. It should be noted that the parameter ranges given in FIGS. 18A and 18B are merely exemplary, and those skilled in the art may adapt these parameters to specific product requirements.

FIG. 18A schematically illustrates a cross-sectional view of a non-intersecting position of a first black matrix strip BM1 and a second black matrix strip BM2 in a direction perpendicular to a data line, and associated parameters, of a color film substrate according to one or more embodiments of the present disclosure, and FIG. 18B is a cross-sectional view of an intersecting position of the first black matrix strip BM1 and the second black matrix strip BM2 in a direction perpendicular to a data line, and related parameters, of a color film substrate according to one or more embodiments of the present disclosure.

With respect to example embodiments of the individual components of the embodiments shown in FIGS. 18A and 18B, reference may be made to descriptions elsewhere herein. Only example parameter ranges for the individual components of the color film substrate are listed herein.

As shown in FIGS. 18A and 18B, a color film substrate provided by an embodiment of the present disclosure may have the following exemplary parameter ranges:

a thickness of the planarization layer OC is about 1.5 to 1.8 µm;
 a top width of the first black matrix strip BM1 extending in the data line direction is about 2.5 to 3.8 µm;
 a bottom width of the first black matrix strip BM1 extending in the data line direction is about 2.2 to 3.6 µm;
 a thickness of the red color resistor is about 1.5 to 2.5 µm;
 a top width of the red color resistor is about 5.7 to 9.0 µm;
 a bottom width of the red color resist is about 7.3~10.8 µm;
 a thickness of the green color resist is about 1.5 to 2.5 µm;
 a top width of the green color resist is about 6.5~9.8 µm;
 a bottom width of the green color resist is about 8.0~11.5 µm;
 a thickness of the blue color resist is about 1.5~2.5 µm;
 a top width of the blue color resist is about 6.0~9.8 µm;
 a bottom width of the blue color resist is about 7.0 to 11.0 µm;
 a slope angle at the intersection of the first black matrix strip BM1 and the second black matrix strip BM2 is about 110° to 120°;
 a thickness of the first black matrix strip BM1 is about 1.0 to 1.5 µm;
 a thickness of the second black matrix strip BM2 at the positions intersecting with first black matrix strips BM1 is about 0.3 to 0.6 µm;
 a thickness of the second black matrix strip BM2 at the positions non-intersecting with the first black matrix strips BM1 is about 1.2 to 1.6 µm; and a depth of the recess is about 0.2 to 0.4 µm.

In embodiments of the present disclosure, etching the substrate of the color film substrate in the data line direction to form the plurality of first recesses 34 may allow the inverted trapezoidal cross-section of the first black matrix strip BM1 to be easily obtained and may ensure the homogeneity of the dimensions (e.g., the width) of the first black matrix strips BM1, and thus the risk of crosstalk due to the difference in the line widths and thicknesses of the RGB color resists when the RGB color resist process is performed may be reduced. The difference in homogeneity performance of the first black matrix strip BM1 may be demonstrated by homogeneity verification data. The average level of difference in the dimensions of the first black matrix strips BM1 in the related art is 0.7 µm, and the dimensional difference of the first black matrixs of the color film substrate provided in embodiments of the present disclosure is reduced to 0.45 µm, so the dimensional homogeneity of the first black matrix is improved by about 38%. In addition, the center viewing angle offset may also be significantly improved by the color film substrate provided in the embodiments of the present disclosure. The lateral viewing angle center normal distribution is improved by 5.73%. The center viewing angle offset is about 12.6% in the related art, and the offset of the color film substrate provided in the embodiments of the present disclosure is about 8.2%. Furthermore, the color film substrates provided in the embodiments of the present disclosure are also important for improving the color crosstalk, and the color crosstalk detection in the related art indicates that the NG rate is 11% for 30° and 30% for 15°, and the color crosstalk detection for the color film substrates provided in the embodiments of the present disclosure indicates that the NG rate is 0.8% for 30°, and 4% for 15°.

The foregoing description of the embodiment has been provided for purpose of illustration and description. It is not intended to be exhaustive or to limit the application. Individual elements or features of a particular embodiment are generally not limited to that particular embodiment, but, where applicable, are interchangeable and may be used in a selected embodiment, even if not specifically shown or described. The same may also be varied in many ways. Such variations are not to be regarded as a departure from the application, and all such modifications are included within the scope of the application.

What is claimed is:

1. A display panel comprising:
    a color film substrate; and
    an array substrate disposed opposite the color film substrate,
    wherein the color film substrate comprises:
        a substrate having:
            a plurality of first recesses each extending in a first direction, and
            a plurality of first tabs arranged alternately with the plurality of first recesses in a second direction perpendicular to the first direction, wherein each of the plurality of first recesses has an opening facing the array substrate such that each of the plurality of first tabs protrudes toward the array substrate;
        a plurality of first black matrix strips disposed at least partially on the plurality of first tabs, respectively, and each extending in the first direction; and
        a color resist layer disposed in the plurality of first recesses and in gaps between adjacent first black matrix strips of the plurality of first black matrix strips.

2. The display panel according to claim 1, wherein the color film substrate further comprises a plurality of second black matrix strips disposed in a different layer than the plurality of first black matrix strips, the plurality of second black matrix strips each extending in the second direction and intersecting with the plurality of first black matrix strips, to define, together with the plurality of first black matrix strips, a plurality of openings for accommodating the color resist layer.

3. The display panel according to claim 2, wherein the color resist layer has a thickness in a direction perpendicular to the substrate substantially equal to a sum of a depth of the first recess in the direction perpendicular to the substrate and a thickness of the first black matrix strip in the direction perpendicular to the substrate.

4. The display panel according to claim 2, wherein the color resist layer comprises a plurality of color resists corresponding one-to-one with the plurality of openings, and wherein at least a surface of at least one of the plurality of first black matrix strips close to the substrate has a width in the second direction greater than a width of at least one of the plurality of first tabs in the second direction such that a portion of at least one of the plurality of color resists between adjacent first black matrix strips has a width in the second direction less than a width of another portion of the at least one of the plurality of color resists in corresponding first recess.

5. The display panel according to claim 1, wherein a surface of at least one of the plurality of first black matrix strips facing the substrate has a width in the second direction less than a width of a surface of the at least one of the plurality of first black matrix strips opposite from the substrate such that a cross-section, perpendicular to the first direction, of the at least one of the plurality of first black matrix strips has a shape with substantial inverted trapezoid.

6. A method for manufacturing the display panel according to claim 1, the method comprising:
    forming a color film substrate comprising:
        providing a substrate;
        forming on the substrate a plurality of first recesses each extending in a first direction, thereby forming a plurality of first tabs arranged alternately with the plurality of first recesses in a second direction perpendicular to the first direction; and
        forming a plurality of first black matrix strips extending in the first direction such that the plurality of first black matrix strips are at least partially disposed on the plurality of first tabs; and
    forming an array substrate which is opposite the color film substrate.

7. The method according to claim 6, further comprising:
    forming a plurality of second black matrix strips each extending in the second direction such that the plurality of second black matrix strips intersect with the plurality of first black matrix strips to define, together with the plurality of first black matrix strips, a plurality of openings for accommodating the color resist layer; and
    forming a color resist layer in the plurality of first recesses and in gaps between adjacent black matrix strips of the plurality of first black matrix strips.

8. The display panel according to claim 2, wherein each of the plurality of first tabs and each of the plurality of first recesses extend continuously in the first direction, and wherein the plurality of first black matrix strips are disposed on the plurality of first tabs, respectively.

9. The display panel according to claim 8, wherein parts of at least one of the plurality of second black matrix strips at positions intersecting with the plurality of first black matrix strips are superimposed on the plurality of first black matrix strips.

10. The display panel according to claim 9, wherein a thickness of the plurality of first black matrix strips and a thickness of the plurality of second black matrix strips comprise at least one of the following:
    i) at least one of the plurality of first black matrix strip strips has a substantially uniform thickness, and parts of the at least one of the plurality of second black matrix strips at the positions intersecting with the plurality of first black matrix strips have a thickness less than a thickness of parts of the at least one of the plurality of second black matrix strips at positions non-intersecting with the plurality of first black matrix strips;

ii) the thickness of the parts of the at least one of the plurality of second black matrix strips at the positions intersecting with the plurality of first black matrix strips is less than the thickness of the at least one of the plurality of first black matrix strips, and wherein the thickness of the parts of the at least one of the plurality of second black matrix strips at the positions non-intersecting with the plurality of first black matrix strips is greater than the thickness of the at least one of the plurality of first black matrix strips; or iii) the thickness of the parts of the at least one of the plurality of second black matrix strips at the positions non-intersecting with the plurality of first black matrix strips is less than a sum of the thickness of the first black matrix strip and a thickness of the first tab.

11. The display panel according to claim 1, wherein at least one of the plurality of first recesses has a substantial rectangular cross-section perpendicular to the first direction.

12. The display panel according to claim 2, wherein the substrate comprises a first area and a second area, the plurality of first black matrix strips, the plurality of second black matrix strips, the plurality of first recesses, and the color resist layer being disposed in the first area of the substrate, wherein the second area comprises an additional black matrix formed integrally with the plurality of first black matrix strips or the plurality of second black matrix strips, and wherein the first area is a display area and the second area is a dummy area.

13. The display panel according to claim 12, wherein each first black matrix strip has a substantially uniform thickness, and wherein the additional black matrix has a thickness in a direction perpendicular to the substrate substantially equal to the thickness of at least one of the plurality of first black matrix strip strips in the direction perpendicular to the substrate.

14. The display panel according to claim 12, further comprising a planarization layer disposed on the plurality of first black matrix strips, the plurality of second black matrix strips, and the color resist layer, wherein the planarization layer extends from the first area to the second area to cover the additional black matrix, and wherein a portion of the planarization layer in the first area has a thickness greater than a thickness of a portion of the planarization layer in the second area.

15. The display panel according to claim 2, wherein the substrate further comprises a plurality of second tabs each extending in the second direction, wherein the plurality of second tabs intersect with the plurality of first tabs such that each first recess is divided by the plurality of second tabs into a plurality of separated first sub-recesses, wherein the plurality of second black matrix strips are disposed on the plurality of second tabs, respectively, and wherein the color resists of the color resist layer are disposed in the plurality of first sub-recesses and in the plurality of openings defined by the plurality of first black matrix strips and the plurality of second black matrix strips.

16. The display panel according to claim 2, wherein the substrate further comprises a plurality of second recesses each extending in the second direction, and wherein each of the plurality of first tabs comprises a plurality of raised islands spaced apart by the plurality of second recesses.

17. The display panel according to claim 16, wherein each of the plurality of first black matrix strips comprises a first portion disposed on the plurality of raised islands and a second portion disposed in the plurality of second recesses, and each of the plurality of second black matrix strips comprises a third portion disposed on the plurality of first black matrix strips and a fourth portion disposed in the plurality of first recesses, and wherein a thickness of the first portion is less than a thickness of the second portion and a thickness of the third portion is less than a thickness of the fourth portion.

18. The display panel according to claim 15, wherein a surface of at least one of the plurality of second black matrix strips close to the substrate has a width less than a width of a surface of the at least one of the plurality of second black matrix strips opposite the substrate such that a cross-section, perpendicular to the second direction, of the at least one of the plurality of second black matrix strips has a shape with substantial inverted trapezoid.

19. A display panel comprising:
a color film substrate comprising:
a substrate having:
a plurality of first recesses each extending in a first direction; and
a plurality of first tabs arranged alternately with the plurality of first recesses in a second direction perpendicular to the first direction, wherein each of the plurality of first recesses has an opening facing the array substrate such that each of the plurality of first tabs protrudes toward the array substrate;
a plurality of first black matrix strips disposed at least partially on the plurality of first tabs, respectively, and each extending in the first direction; and
a color resist layer disposed in the plurality of first recesses and in gaps between adjacent first black matrix strips of the plurality of first black matrix strips; and
an array substrate disposed opposite the color film substrate;
at least one main spacer and at least one sub-spacer on the color film substrate; and
at least one opposing spacer disposed on the array substrate and opposite the main spacer.

20. The display panel according to claim 19, wherein the at least one main spacer has a thickness greater than a thickness of the at least one sub-spacer, the display panel comprises a display area and a dummy area, the at least one opposing spacer comprises at least one first opposing spacer in the display area and at least one second opposing spacer in the dummy area, and the at least one first opposing spacer in the display area has a thickness less than a thickness of the at least one second opposing spacer in the dummy area.

* * * * *